United States Patent
Egiziano et al.

(10) Patent No.: US 8,189,352 B2
(45) Date of Patent: May 29, 2012

(54) SINGLE STAGE INVERTER DEVICE, AND RELATED CONTROLLING METHOD, FOR CONVERTERS OF POWER FROM ENERGY SOURCES, IN PARTICULAR PHOTOVOLTAIC SOURCES

(75) Inventors: Luigi Egiziano, Fisciano (IT); Nicola Femia, Fisciano (IT); Domenico Granozio, Fisciano (IT); Giovanni Petrone, Fisciano (IT); Giovanni Spagnuolo, Fisciano (IT); Massimo Vitelli, Fisciano (IT)

(73) Assignee: Universita' Degli Studi di Salerno, Fisciano (SA) (IT)

( * ) Notice: Subject to any disclaimer, the term of this patent is extended or adjusted under 35 U.S.C. 154(b) by 501 days.

(21) Appl. No.: 11/993,453

(22) PCT Filed: Dec. 20, 2005

(86) PCT No.: PCT/IT2005/000747
§ 371 (c)(1),
(2), (4) Date: Mar. 5, 2010

(87) PCT Pub. No.: WO2007/007360
PCT Pub. Date: Jan. 18, 2007

(65) Prior Publication Data
US 2010/0265747 A1    Oct. 21, 2010

(30) Foreign Application Priority Data
Jul. 13, 2005  (IT) .............................. SA2005A0014

(51) Int. Cl.
  *H02J 3/36* (2006.01)

(52) U.S. Cl. ........... 363/35; 323/906; 323/207; 363/131

(58) Field of Classification Search .................... 363/35, 363/16, 131; 323/906, 207
See application file for complete search history.

(56) References Cited

U.S. PATENT DOCUMENTS
4,375,662 A    3/1983   Baker
(Continued)

FOREIGN PATENT DOCUMENTS
WO    2004100344 A    11/2004
(Continued)

OTHER PUBLICATIONS

Yang Chen et al.: "A new maximum power point tracking controller for photovoltaic power generation" APEC 2003. 18th Annual IEEE Applied Power Electronics Conference and Exposition. Miami Beach, FL, Feb. 9-13, 2003, pp. 58-62.

(Continued)

*Primary Examiner* — Shawn Riley
(74) *Attorney, Agent, or Firm* — Roberts Mlotkowski Safran & Cole P.C.

(57) ABSTRACT

The present invention concerns a single stage inverter device for power converters, comprising switching means (M1-M4) capable to periodically connect an energy source, in particular a photovoltaic one, to an electric network or grid, the switching means (M1-M4) being controlled by controlling electronic means operating according to a single switching cycle control of the switching means (M1-M4), the operative and circuit device parameters being such to fulfill a series of constraints simultaneously optimizing both the maximum power point tracking or MPPT (Maximum Power Point Tracking) and the output power factor or PF-out (Power Factor-output) for one or more operation conditions. The present invention further concerns the related method of controlling and the related method of scaling such device.

25 Claims, 15 Drawing Sheets

U.S. PATENT DOCUMENTS

| | | | |
|---|---|---|---|
| 5,077,652 | A | 12/1991 | Faley |
| 6,111,767 | A | 8/2000 | Handleman |
| 6,285,572 | B1 | 9/2001 | Onizuka et al. |
| 7,952,897 | B2 * | 5/2011 | Nocentini et al. ............... 363/41 |
| 8,089,785 | B2 * | 1/2012 | Rodriguez ...................... 363/35 |
| 2004/0264225 | A1 | 12/2004 | Bhavaraju et al. |
| 2005/0002214 | A1 | 1/2005 | Deng |
| 2005/0110454 | A1 | 5/2005 | Tsai et al. |

FOREIGN PATENT DOCUMENTS

| | | | |
|---|---|---|---|
| WO | 2004100348 A | 11/2004 | |

OTHER PUBLICATIONS

Chen Y. et al: "A cost effective Single-Stage Inverter With Maximum Power Point Tracking" IEEE Transactions on Power Electronics, IEEE Service Center, Piscataway, NJ, US, vol. 19, No. 5, Sep. 2004.

Tsai-Fu Wu et al. "Single-Stage Converters for PV Lighting Systems with MPPT and Energy Backup" IEEE Transactions on Aerospace and Electronic Systems, IEEE Service Center, Piscataway, NJ, US, vol. 35, No. 4, Oct. 1999, pp. 1306-1317.

K.M. Smedley, S. Cuk, "One-cycle control of switching converters", Power Electronics, IEEE Transactions on vol. 10, Issue 6, Nov. 1995, pp. 625-633.

S. Liu and R.A. Dougal in "Dynamic multiphysics model for solar array", IEEE Transactions on Energy Conversion, vol. 17, No. 2, Jun. 2002, pp. 285-294.

N. Femia, G. Petrone, G. Spagnuolo, M. Vitelli, "Optimizing Sampling Rate of P&O MPPT Technique", presented at the Proc. of IEEE Power Electronics Specialist Conference, Jun. 2004, Aachen (Germany), pp. 1945-1949.

N. Femia, G. Petrone, G. Spagnuolo, M. Vitelli, "Optimizing Duty-cycle Perturbation of P&O MPPT Technique", presented at the Proc. of IEEE Power Electronics Specialist Conference, Jun. 2004, Aachen (Germany), pp. 1939-1944.

International Search Report for International Application No. PCT/IT2005/000747 mailed Jul. 17, 2007.

* cited by examiner

SINGLE STAGE INVERTER DEVICE, AND RELATED CONTROLLING METHOD, FOR CONVERTERS OF POWER FROM ENERGY SOURCES, IN PARTICULAR PHOTOVOLTAIC SOURCES

CROSS-REFERENCE TO RELATED APPLICATIONS

The present Application is a U.S. national phase of PCT/IT/2005/00747 filed on Dec. 20, 2005, which claims priority from Italian Application No. SA2005A000014 filed on Jul. 13, 2005, both of which and WO2007/007360 are hereby incorporated by reference in their entirety into the present Application.

FIELD OF THE INVENTION

The present invention concerns a single stage inverter device for a power electronic converter, with alternate current output and direct current input (dc-ac), for energy sources, in particular renewable energy sources, preferably photovoltaic sources, based on the so called switching one-cycle control or OCC technique, with maximum power point tracking or MPPT that is static or possibly dynamically adaptive through Perturb&Observe or P&O technique, the device being simple, reliable, efficient, precise, and inexpensive, simultaneously optimising both the MPPT control and the output Power Factor or PF-out of the dc-ac converter, so as to possibly also achieve the real maximum power point tracking of the photovoltaic field through dynamic adaptation to the operation instant conditions of the photovoltaic field.

The present invention further concerns the related method of scaling the characteristic parameters of such inverter device and the related controlling method.

BACKGROUND OF THE INVENTION

In the following description specific reference will be made to the application of single-phase power dc-ac converters for energy photovoltaic sources known as so-called "grid-connected" systems (connected to an alternate current electric energy distribution network), but it should be understood that the inverter device (and the related controlling method) according to the invention may be applied to both single-phase and multi-phase converters for any energy source, in particular renewable, such as fuel cells, wind turbines, and other sources having a variable maximum power point, or more generally a maximum energy convenience point maximum energy convenience point, at the input, and a constrained PF-out at the output. More in general, the inverter device according to the invention may be applied to converters for any energy source that is characterised by the existence of particular specific operation conditions which are deemed preferential, in relation to produced energy, energy efficiency, component stress degree, life, or any other evaluation factor may be defined for a specific source, and which conditions are variable, due to climatic or physical factors or factors of any nature, which are either controllable or uncontrollable, either predictable or unpredictable, and identifiable through a particular point of one of the source output electrical characteristic curves such as power-voltage, power-current, voltage-current, current-voltage, efficiency-voltage, efficiency-current or other ones similar thereto.

It is known that electronic power converters used in photovoltaic systems called "grid-connected" achieve the dual function of extracting the maximum power from the photovoltaic field (MPPT) and delivering the extracted power to the alternate current or AC network with high output Power Factor (PF-out), wherein the current is in phase with the voltage and presents a low harmonic distortion.

The market presently offers several photovoltaic inverters, generally based on a double stage architecture, of the type shown in FIG. 1 for a single-phase application, interposed between the photovoltaic source 1 and the ac electric energy distribution grid 2. Such architecture presents as main advantage some ease of design and implementation thanks to the separation of the two functionalities of MPPT and dc-ac conversion with PF-out control: the first one is achieved by the dc-dc converter 3, controlled by the maximum power point tracking MPPT module 4 connected to the output of the source 1, while the functionality of dc-ac conversion is achieved through the dc-ac converter 5, controlled by the module 6 connected to the input of the grid 2.

Through a careful design of the controller of each stage, it is possible to attain satisfactory performance in terms of both efficiency of energy extraction from the photovoltaic field 1 and electric efficiency of conversion from the photovoltaic field 1 to the grid 2.

However, such system presents some drawbacks and limitations, such as: the high costs of the components of the two power stages; the performance decay at low levels of current; the basically slow dynamics due to the passage of energy through the dc bus sustained by a high-capacity bulk capacitor 7; the need of stabilising the bulk voltage without suppressing the grid second harmonic ripple.

Since the cost of a photovoltaic system is made up by about 50% by the cost of the photovoltaic modules and by 30-40% by the photovoltaic inverter, reducing the cost of the latter may be surely an interesting incentive to a wider diffusion of the use of renewable sources for producing electric energy, thus meeting a diffused social, economic, and environmental need.

Consequently, in the last years some devices have been developed attempting to solve the problem of the costs of a photovoltaic inverter. Such solutions are based on:

the use of single stage inverters, wherein the functionalities of MPPT, dc-ac inversion, and PF-out control are integrated in a single power circuit;

the development of integrated control techniques allowing to achieve the combined function of MPPT, dc-ac inversion, and PF-out control; and the implementation of control circuits integrated on microchip, developed and optimised for ensuring the achievement of the functionalities necessary to the single stage photovoltaic inverter in a robust and adaptive way with respect to the characteristics of the source photovoltaic field.

In particular, Y. Chen and K. Ma. Smedley, in "*A cost-effective single-stage inverter with maximum power point tracking*", IEEE Transactions on Power Electronics, Vol. 19, No. 5, September 2004, pp. 1289-1294, have recently proposed the application of the OCC control, as shown in FIG. 2, to a single stage inverter for photovoltaic use, wherein a dc-ac converter, connected at its input to the photovoltaic source 1 and at its output to the grid 2, comprises four semiconductor power switches M1-M4 (preferably implemented through respective MOSFETs or IGBTs). The single stage inverter is controlled by a driving unit 8, that operates on the basis of values of certain electric quantities at input and output of the same converter, through the One-Cycle Control technique, for controlling the voltage of a converter over a single switching cycle. More in detail, as also disclosed by K. M. Smedley, S. Cuk, "*One-cycle control of switching converters*", Power Electronics, IEEE Transactions on Volume 10, Issue 6, November 1995 pp. 625-633, the OCC technique is a non linear control technique that offers significant advantages in terms of line noise rejection and response speed, that is based on the integration function of a suitable variable (voltage or current), with switching waveform, in order to impose its average value equal to a value indicated by a control reference signal (in particular a control voltage Vc).

However, the scaling of the OCC controller 19 of FIG. 2, intended for a photovoltaic MPPT application, requires an adequate design/circuit approach and an accurate setting of the circuit parameters, in order to be able to really achieve both the MPPT control and the PF-out optimisation with performance comparable to that of a present good performance double stage system. In the system of FIG. 2, power passes from the photovoltaic field 1 to the grid 2 through the inverter, that operates as a so called buck converter (i.e. a dc-dc converter that provides for an output average voltage less than the input dc voltage by varying the duty cycle of a switch connecting the input to the output, i.e. the ratio between the time during which the switch is closed and the period of the periodic signal controlling the switch) in each half cycle of the frequency of the line 2 thanks to the control circuit 8.

By observing FIG. 2, the inner pulse width modulation PWM loop is characterised by a high speed and it determines, cycle by cycle, the duty-cycle value necessary for obtaining a quasi-sinusoidal output current following the waveform of the line ac voltage $v_o(t)$. The outer loop, instead, is intended for the MPPT function and it adjusts the output power according to the maximum power that may be extracted from the photovoltaic field 1.

In the following of the present description and in the claims, the following correspondences between symbols and electric quantities will be used:
  vg(t) indicates the instant voltage generated by the photovoltaic field 1;
  vm(t) indicates a voltage instant value defined by the following equation $$v_m(t) = \left(\frac{V_c - K_g \cdot v_g(t)}{R_1 C_1}\right) \cdot T_s$$

where $K_g$ is a constant, Ts is the switching period of the power stage, i.e. of the inverter switches M1-M4, and the other quantities are immediately comprehensible on the basis of FIG. 2;
  vo(t) indicates the instant value of the voltage of the grid 2;
  io(t) indicates the instant value of the inverter output current;
  d(t) indicates the instant value of the inverter duty cycle;
  vg, vm, vo, io, and d indicate the instant average values, i.e. the average values calculated over a switching period Ts, of the respective instant variables vg(t), vm(t), vo(t), io(t), and d(t);
  Vg and Vm indicate the average values of the corresponding instant variables vg(t) and vm(t), calculated over a period Tgrid of the voltage vo(t) of the grid 2; and
  Vo and Io indicate the effective values of the corresponding instant variables vo(t) and io(t), calculated over a period Tgrid of the voltage vo(t) of the grid 2.

Still making reference to FIG. 2, as disclosed by Chen and Smedley, the OCC control ensures a high PF-out if the output current $i_o(t)$ is proportional to the grid voltage $v_o(t)$, that is if:

$$i_o = (K_1 - K_2) \cdot v_o \quad [1]$$

where $K_1$ and $K_2$ are positive constants, the values of which determine the operation power levels of the inverter.

By multiplying equation [1] by the sensing resistance $R_s$ and taking account of the conversion ratio of the buck converter, equal to $$d = v_o / V_g$$

where d is the duty cycle and $V_g$ is the average value of the dc voltage of the photovoltaic field 1 over a period Tgrid of the voltage vo(t) of the grid 2, equation [1] becomes:

$$R_s \cdot i_o = R_s \cdot K_1 \cdot v_o - R_s \cdot K_2 \cdot v_o = R_s \cdot K_1 \cdot v_o - R_s \cdot K_2 \cdot v_g \cdot d = K \cdot v_o - v_m \cdot d \quad [2]$$

where $$K = R_s \cdot K_1 \text{ and}$$

$$v_m = R_s \cdot K_2 v_g \quad [3]$$

Consequently:

$$K \cdot v_o - R_s \cdot i_o(t) = v_m \cdot d \quad [4]$$

Equation [4] constitutes the basic relation for achieving the OCC control through the inner bop of FIG. 2.

The average output power $P_o$ may be derived from equations [2][3] and [4]:

$$P_o = V_o \cdot I_o = V_o \cdot \left(\frac{K - \frac{V_m}{V_g}}{R_s}\right) \cdot V_o = \frac{V_o^2}{R_s} \cdot \left(K - \frac{V_m}{V_g}\right) \quad [5]$$

where $V_o$ and $I_o$ are the effective values of the output voltage and current, $v_o(t)$ and $i_o(t)$, respectively. From FIG. 2 and equation [3] it follows:

$$v_m = \left(\frac{V_c - K_g \cdot v_g}{R_1 C_1}\right) \cdot T_s \quad [6]$$

where $K_g$ is a constant, R1·C1 is the time constant τ of the integrator circuit 9, and Vc is the control voltage.

Hence, the output power $P_o$ is equal to:

$$P_o = \frac{V_o^2}{R_s}\left(K + \frac{K_g T_s}{R_1 C_1} - \frac{V_c T_s}{V_g R_1 C_1}\right) \quad [7]$$

Equation [7] gives the inverter output power $P_o$ as a function of parameters K, $K_g$, $V_c$, $R_1$, $C_1$, $R_s$ and $T_s$. In particular, it indicates that it is necessary to adequately choose the aforesaid parameters in order to maximise the inverter output power $P_o$, i.e. the output power of the photovoltaic field 1.

For a stable operation of the OCC controller 19, Chen and Smedley have indicated the following conditions:

$$R_1 C_1 < T_s \quad [13]$$

$$V_c \geq K_g V_g + \frac{(2V_{o,max} - V_g) R_s R_1 C_1}{2L} \quad [14]$$

where $V_o$ is the control voltage and $V_{o,max}$ is the maximum value assumed by the output voltage $v_o(t)$. Therefore, the parameters characterising the OCC controller 19 of the system of FIG. 2, determining its performance in photovoltaic applications, are the operative parameters $K_g$, $V_c$, and K, and the circuit parameters R1, C1, Rs.

However, the converter proposed by Chen and Smedley, illustrated with reference to FIG. 2, suffers from some drawbacks, due to the fact that the above constraints [13] and [14] do not ensure the real operation of the photovoltaic single stage inverter with maximum power point tracking (MPPT) and high PF-out in any operation condition, such as for instance in variable sunlight conditions.

In fact, in order to obtain a robust PF-out control it is necessary that, at any sun irradiance level S within the operation range [$S_{min}$, $S_{max}$] that is intended to ensure, the OCC controller 19 is capable to properly modulate the output current $i_o(t)$ according to equation [4] and the output power $P_o$ according to equation [5]. The average power $P_o$ is modulated by the term ($K-V_m/V_g$) depending on the irradiance level S through the term $V_m/V_g$. Such ratio appears in equation [5] and hence the oscillations of the voltage of the photovoltaic field 1 translate into a perturbation of the term $v_m(t)/v_g(t)$ that strongly affects the waveform of the output current $i_o(t)$.

In other words, Chen and Smedley have proposed design equations allowing infinite solutions (though corresponding to levels of efficiency of extraction of power from the photovoltaic field lower than the maximum one), but they have not been capable to give explicit and defined guidelines for setting the aforementioned parameters, nor systematic treatment of the problem and solution strategies are available in the technical-scientific literature. In fact, Chen and Smedley have presented only one example of solution based on the trial-and-error approach, that is of poor both technical-scientific and application interest, since it is the result of a non systematic approach and it does not give results ensuring good performance.

Therefore, the OCC technique applied to the nowadays available photovoltaic single stage inverter does not include in a reliable and efficient way the MPPT functionality simultaneously also optimising the PF-out, and it does not include a method for optimally determining or setting the parameters. In fact, the locus of the operation points of the OCC single stage inverter is identified by a static curve in the p-v (power-voltage) plane that does not intersect the p-v curve of the photovoltaic field in points corresponding to the maximum power points related to the various sunlight levels, except for a particular and unpredictable sunlight value.

SUMMARY OF THE INVENTION

It is therefore an object of the present invention to provide an OCC single stage inverter, capable to simultaneously optimise both the MPPT control and the output PF-out of a dc-ac converter connected between an energy source, in particular photovoltaic, and an electric network, the set of values of the parameters of which is identified in a fixed way, allowing to achieve the static curve, more preferably a set of static curves, of the inverter operation points that approaches as much as possible the locus of the maximum power MPP points of the source, for instance of the photovoltaic field, described according to the variation of the operation conditions, such as sunlight, temperature, and degradation of the efficiency of the photovoltaic field panels.

It is still an object of the present invention to provide an OCC single stage inverter the controller of which has a set of values of the parameters identified in a dynamically variable way when the operation conditions of the energy source vary.

It is a further object of the present invention to provide such a photovoltaic inverter that is simple, reliable, efficient, precise, and inexpensive.

It is specific subject matter of the present invention a single stage inverter device, as defined in independent claim 1.

Further embodiments of the inverter device according to the invention are described by dependent claims 2-13.

It is still subject matter of the present invention a method for controlling over single switching cycle switching means of a single stage inverter device, as defined in independent claim 14.

Further embodiments of the single switching cycle controlling method according to the invention are described by dependent claims 15-17.

It is always subject matter of the present invention a method of scaling such an inverter device, as defined in independent claim 18.

Further embodiments of the scaling method according to the invention are described by dependent claims 19-23.

It is further subject matter of the present invention a controller device as defined in independent claim 24.

Further embodiments of the controller device according to the invention are described by dependent claim 25.

The present invention will now be described, by way of illustration and not by way of limitation, according to its preferred embodiments, by particularly referring to the Figures of the enclosed drawings, in which:

BRIEF DESCRIPTION OF THE DRAWINGS

In the Figures, alike elements are indicated by same reference numbers.

DETAILED DESCRIPTION

The inventors have developed a new method for setting the optimal parameters of the control circuit of a photovoltaic single stage inverter, based on the one-cycle control technique, (i.e. the operative parameters $K_g$, $V_c$, and $K$, and the circuit parameters $R1$, $C1$, $Rs$), that allows to delimit the region of the inverter operation the points of which are located within a fixed distance from the maximum power point MPP of a photovoltaic field of given characteristics.

The first step of the optimisation method consists in just limiting the search space of the set of parameter values, represented by equations expressing constraints to meet, arriving to define a Region of Acceptability (RA) within the Space of Parameters (SP). In particular, the inventors have developed some new equations representing a constraint on the inverter PF-out that is valid over the whole range of power coming from the photovoltaic field that the inverter has to sustain.

Furthermore, the inventors have developed three merit figures which allow to evaluate the quality of the MPPT OCC controller in terms of maximum power extracted from the photovoltaic field.

Moreover, on the basis of the aforementioned constraint equations and merit figures, the optimisation method developed by the inventors identifies the set of the OCC controller parameters that is optimal in order to delimit the region of maximum power point tracking (MPPT).

Figure 1:
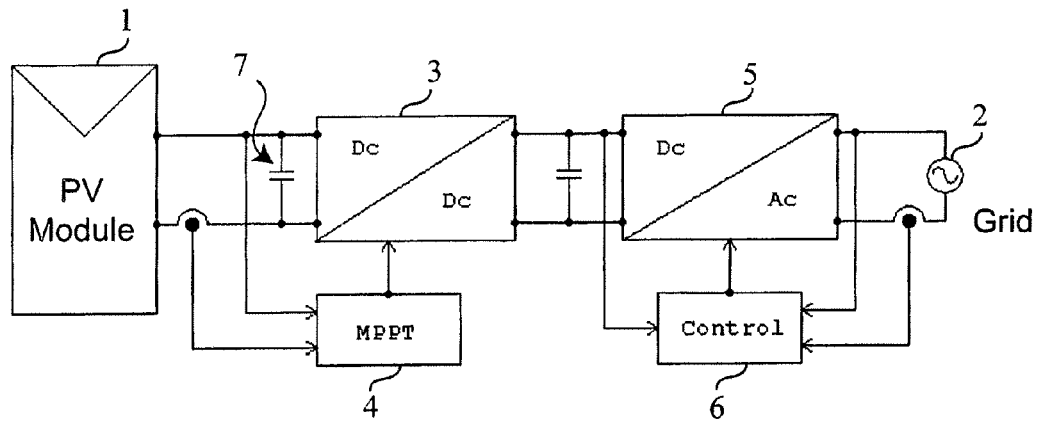
FIG. 1 schematically shows a double stage inverter device of the prior art.
Figure 2:
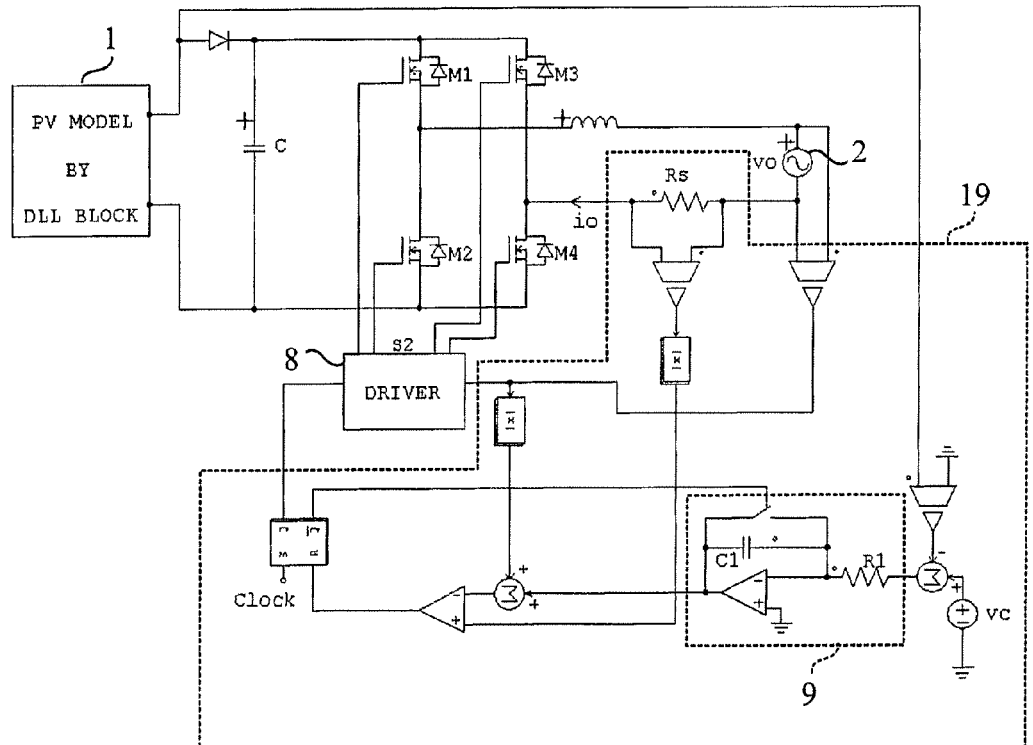
FIG. 2 schematically shows a single stage inverter device of the prior art.

On the basis of the above, the inventors have developed a new control circuit integrating the conventional OCC analog circuit, shown in FIG. 2, with a digital circuit that may implement the maximum power operation in static sunlight conditions, as well as the dynamic maximum power point tracking (MPPT), through the P&O technique, by operating on one of the setting parameters of the OCC controller for achieving a real maximum power point tracking of the photovoltaic field through dynamic adaptation to the instant conditions of the photovoltaic field operation as imposed by sunlight and temperature, preferably, but not exclusively, detected through the field voltage and current.

The result of the above is a single stage photovoltaic inverter device implemented through an OCC-MPPT integrated controller optimised in static and/or dynamic way, intended for applications of the single-phase and three-phase type.

More in general, the single stage inverter device that is the subject matter of the invention, with OCC-MPPT, and possibly P&O, integrated control is capable to achieve in an automatic way, and possibly also dynamically, for any energy source, such as for instance fuel cells, batteries, and wind sources, specific operation conditions deemed to be preferential for the considered source.

In order to adequately choose the parameters $K$, $K_g$, $V_c$, $R_1$, $C_1$, $R_s$ and $T_s$ of equation [7] for maximising the output power $P_o$ of the inverter, i.e. of the photovoltaic field 1, the inventors have developed a new representation of the average power $P_i$ at the inverter input as sum of the inverter internal losses $P_{InverterLosses}$, the average power $P_{Rs}$ wasted by the sensing resistance $R_s$, and the average power $P_o$ injected into the grid:

$$P_i = P_o + P_{Rs} + P_{InverterLosses} \quad [8]$$

By neglecting the internal losses $P_{InverterLosses}$, the losses due to $R_s$ may lead to an expression useful for the aim of optimising the parameters:

$$P_{Rs} = R_s \cdot I_o^2 \quad [9]$$

from equations [7] and [8] and from equation [4] expressed in terms of effective values the following expression of the average power $P_i$ at the inverter input is obtained:

$$P_1 \cong P_o + R_s \cdot I_o^2 = V_o \cdot \frac{K \cdot V_o - V_m \cdot D}{R_s} + R_s \cdot \left(\frac{K \cdot V_o - V_m \cdot D}{R_s}\right)^2 \Rightarrow \quad [10]$$

$$P_1 \cong \frac{V_o^2}{R_s} \cdot \left(K - \frac{V_m}{V_g} + K^2 + \frac{V_m^2}{V_g^2} - 4 \cdot K \frac{V_m}{V_g}\right)$$

The average voltage $V_g$ of the photovoltaic field 1 is given by the following non linear constraint equation expressing the balance between the power $P_g$ generated by the photovoltaic field 1 and the power $P_i$ given by equation [10]:

$$P_i(V_g) = P_g(V_g) \quad (11)$$

The power $P_g$ generated by the photovoltaic field 1 may be evaluated through the non linear model proposed by S. Liu and R. A. Dougal in "*Dynamic multiphysics model for solar array*", IEEE Transactions on Energy Conversion, Vol. 17, No. 2, June 2002, pp. 285-294, that provides the current $I_g$ of the photovoltaic field 1 as a function of the voltage $V_g$ of the photovoltaic field 1, of the temperature T of the panels, of the solar irradiance S and of the number of series-connected and parallel-connected panels constituting the field:

$$I_g = I_H - I_s \cdot \left(e^{\frac{V_g + R_{series} \cdot I_g}{\eta \cdot V_T}} - 1\right) - \frac{V_g + R_{series} \cdot I_g}{R_{shunt}} \quad [12]$$

where $R_{series}$ and $R_{shunt}$ are series and shunt, respectively, parasitic resistances which depend on the number of panels and on their connection, besides on the type of panel, $I_H$ is the light induced current depending on the solar irradiance S and on the panel temperature T, $\eta$ is the diode ideality factor schematising the photovoltaic field, $I_s$ and $V_T$ are respectively the saturation current and the thermal voltage, both depending on the panel temperature T.

For the correct operation of the OCC inverter, besides the constraints represented by equations [13] and [14], the effect of the oscillation, typically at a frequency of 120 Hz/100 Hz, of the voltage $V_g$ of the photovoltaic field 1 caused by the grid 2 (as also illustrated by S. Baekhoej et al.) must be suitably considered. In particular, the control voltage $V_c$ must meet the following constraint:

$$V_c > K_g(V_g + \Delta V_g) \quad [21]$$

where $\Delta V_g$ is the peak-to-peak amplitude of the 120 Hz/100 Hz oscillation, that is represented by:

$$\Delta V_g = \frac{P_i}{\omega_{grid} V_g C_b} \quad [22]$$

where $\omega_{grid}$ is the pulsation frequency of the grid 2 (in rad/s) and $C_b$ is the capacitance of the buffer capacitor. The constraint of equation [21] ensures that the input voltage of the resettable integrator 9 of the OCC controller 19 of FIG. 2 is always positive. If the constraint were violated, the consequent phase inversion at the output of the resettable integrator 9 would produce a control fault and a decay of the output PF-out power factor.

The inventors have defined a further constraint condition that allows to ensure an optimal behaviour of the inverter operating as double buck converter:

$$V_g - \Delta V_g > (1+K) \cdot V_{o,max} \quad [23]$$

The constraint represented by equation [23] ensures that, at any time instant, the input voltage of the bridge comprising the four switches M1-M4 is higher than its output voltage, taking account of the worst case occurring when the voltage of the photovoltaic field 1, affected by the ripple at frequency $2f_{grid}$ (wherein $f_{grid}$ is preferably equal to 50 Hz or 60 Hz) produced by the ac electric energy distribution network 2, assumes its minimum value ($V_g - \Delta V_g$) and the voltage drop on the sensing resistance $R_s$ assumes its maximum value $$R_s \cdot I_{o,max} = R_s \cdot K_1 \cdot V_{o,max} = K \cdot V_{o,max}$$

As said before, in order to obtain a robust PF-out control it is necessary that, at any level of solar irradiance S within the range of operation that is desired to ensure [$S_{min}, S_{max}$], the OCC controller 19 is capable to correctly modulate the output current $i_o(t)$ according to equation [4] and the average output power $P_o$ according to equation [5], that is modulated by the term ($K - V_m/V_g$) depending on the level of irradiance S through the term $V_m/V_g$. The oscillations of the voltage $v_g(t)$ of the photovoltaic field 1 translates into a disturbance of the term $V_m/V_g$ strongly affecting the waveform of the output current $i_o(t)$ and the range of which the inventors have evaluated.

Starting from equation [6], the range of variation $$\left[ \left.\frac{V_m}{V_g}\right|_{min}, \left.\frac{V_m}{V_g}\right|_{max} \right]$$

of the ratio $V_m/V_g$ is defined by the following values:

$$\left.\frac{V_m}{V_g}\right|_{min} = \frac{V_c - K_g \cdot (V_g + \Delta V_g)}{V_g + \Delta V_g} \cdot \frac{T_s}{R_1 \cdot C_1} \quad [24]$$

$$\left.\frac{V_m}{V_g}\right|_{max} = \frac{V_c - K_g \cdot (V_g + \Delta V_g)}{V_g - \Delta V_g} \cdot \frac{T_s}{R_1 \cdot C_1} \quad [25]$$

For ensuring a high PF-out factor, the extreme values of $V_m/V_g$ given by equations [24] and [25] must fall within an interval determined as a function of the deliverable photovoltaic power and of the maximum power that the inverter is capable to sustain. The upper bound $P_{o\_max}$ of the inverter output power is given by $$P_{o\_max} = K V_o^2 / R_s$$

For a correct operation of the photovoltaic conversion system, the inverter must be able to deliver a power $P_o$ at least equal to the maximum power $P_{g,MPP}(S_{max})$ deliverable by the photovoltaic field 1 in correspondence with the maximum sunlight level $S = S_{max}$ and at the corresponding voltage $V_g$:

$$\alpha \cdot P_{g,MPP}(S_{max}) = K \frac{V_o^2}{R_s} \quad [26]$$

where the coefficient $\alpha$ (with $\alpha \geq 1$) expresses the inverter overloading capacity with respect to the maximum input power $P_{g,MPP}(S_{max})$ provided by the photovoltaic field 1. Equation [26] may be transformed in an explicit form with respect to the ratio $V_m/V_g$ through equation [5]:

$$P_o = K \cdot \frac{V_o^2}{R_s} \cdot \left(1 - \frac{V_m}{V_g} \cdot \frac{1}{K}\right) = \alpha \cdot P_{g,MPP}(S_{max}) \cdot \left(1 - \frac{V_m}{V_g} \cdot \frac{1}{K}\right) \quad [27]$$

and thus:

$$\frac{V_m}{V_g} = K \cdot \left(1 - \frac{P_o}{\alpha \cdot P_{g,MPP}(S_{max})}\right) \quad [28]$$

The ratio $V_m/V_g$ expressed in equation [28] depends on the sunlight level S in correspondence with which the inverter output power $P_o$ is evaluated and it allows to fix the range within which the extreme values given by equations [24] and [25] must be included:

$$\left[\left.\frac{V_m}{V_g}\right|_{min}, \left.\frac{V_m}{V_g}\right|_{max}\right] \subset K \cdot \left(1 - \frac{P_o}{\alpha \cdot P_{g,MPP}(S_{max})}\right) \cdot [(1-\gamma), (1+\gamma)] \quad [29]$$

where the coefficient $\gamma < 1$ defines the bounds allowed for the range of the ratio $V_m/V_g$ determined by $\Delta V_g$, from which it is obtained:

$$K\left(1 - \frac{P_o(S)}{\alpha \cdot P_{g,MPP}(S_{max})}\right) \cdot (1-\gamma) \leq \left.\frac{V_m}{V_g}\right|_{min} \leq \left.\frac{V_m}{V_g}\right|_{max} \quad [30\text{-}a]$$

$$\left.\frac{V_m}{V_g}\right|_{min} \leq \left.\frac{V_m}{V_g}\right|_{max} \leq K\left(1 - \frac{P_o(S)}{\alpha \cdot P_{g,MPP}(S_{max})}\right) \cdot (1+\gamma) \quad [30\text{-}b]$$

The new constraints represented by equations [23] and [30] require, for the correct operation of a OCC single-stage photovoltaic inverter, the determination of a systematic solving method in order to find the set of values to assign to the characteristic parameters that allows to attain optimal performance. In particular, the characteristic parameters of the OCC inverter to determine are K, $K_g$, $R_s$, $V_c$, $\tau$, where $\tau = R_1 C_1$, assuming the remaining parameters $V_o$, $T_s$, L, C, $\omega_{grid}$ as fixed.

To this end, the inventors have developed three distinct merit figures providing, for each possible specific set of values of the characteristic parameters of the OCC inverter, a performance index in terms of power extracted from the photovoltaic field.

The first merit figure, referred to as "$\psi_1$", represents the difference between the maximum power $P_{g,MPP}(S_{min})$ of the photovoltaic field 1 and the inverter output power $P_o(S_{min})$, evaluated at the minimum sunlight level $S_{min}$ related to the range $[S_{min}, S_{max}]$ of interest, and it is given by:

$$\psi_1 = P_{g,MPP}(S_{min}) - P_o(S_{min}) \quad [31]$$

Specific sets of values of the characteristic parameters of the OCC inverter ensuring low values of such first merit figure $\psi_1$ are particularly adapted to attain a high photovoltaic conversion efficiency in places with high cloudiness level and hence low sunlight level S.

The second merit figure, referred to as "$\psi_2$", represents the difference between the maximum power $P_{g,MPP}(S_{max})$ of the photovoltaic field and the inverter output power $P_o(S_{max})$ at the maximum sunlight level $S_{max}$ related to the range $[S_{min}, S_{max}]$ of interest, and it is given by:

$$\psi_2 = P_{g,MPP}(S_{max}) - P_o(S_{max}) \quad [32]$$

Specific sets of values of the characteristic parameters of the OCC inverter ensuring low values of such second merit figure $\psi_2$ are particularly adapted to attain high photovoltaic conversion efficiencies in places with low cloudiness level.

The third merit figure, referred to as "$\psi_3$", represents the root mean square deviation of the maximum power $P_{g,MPP}(S)$ of the photovoltaic field from the inverter output power $P_o(S)$ over the whole range $[S_{min}, S_{max}]$ of interest of the sunlight level S, discretised into N equally distributed levels:

$$\Psi_3 = \sqrt{\sum_{k=1}^{N} \frac{[P_{g,MPP}(S_k) - P_o(S_k)]^2}{P_{g,MPP}^2(S_k)}} \quad [33]$$

Specific sets of values of the characteristic parameters of the OCC inverter ensuring low values of such third merit figure $\psi_3$ are adapted to attain good photovoltaic conversion efficiency mean values.

The three merit figures $\psi_1$, $\psi_2$, and $\psi_3$ may be used for a systematic exploration of the parameter space SP, implementable through both deterministic and stochastic numerical techniques, suitable for different application contexts related to the range $[S_{min}, S_{max}]$ of interest.

Figure 3:
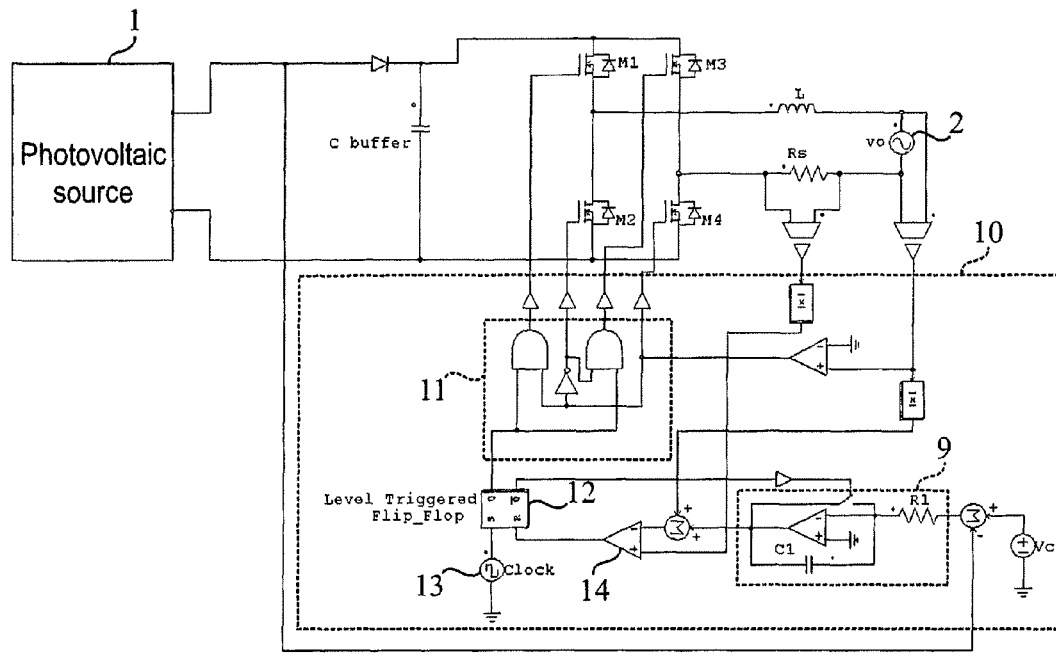
FIG. 3 shows a preferred embodiment of the device according to the invention, having a first scaling of parameters.

FIG. 3 shows a first embodiment of the single stage inverter device according to the invention, that meets the constraints represented by equations [13], [14], [21], [23] and [30], and that further minimises the three merit figure $\psi_1$, $\psi_2$, and $\psi_3$ represented by equations [31]-[33].

In particular, it may be observed that, similarly to the prior art device of FIG. 2, the device of FIG. 3 comprises four semiconductor power switches M1-M4 (preferably implemented through respective MOSFETs or IGBTs), the gate terminals of which are controlled by the controller 10. The controller 10 receives as inputs the voltage $v_g(t)$ of the photovoltaic field 1, the ac voltage $v_o(t)$ of the grid 2, and the value of the voltage drop on the resistor $R_s$ sensing the inverter output current $i_o(t)$.

Specifically, the gate terminals of the four switches M1, M2, M3 and M4 are controlled so that, during the time interval in which the voltage of grid 2 presents positive values with respect to the polarity indicated in FIG. 3, M4 is closed (i.e., conducting), M2 and M3 are open (i.e., not conducting) while M1 is being closed and open with period Ts, so that M1 is conducting during the first part of the switching period Ts, of length equal to the product of the switching duty-cycle multiplied by the switching period Ts, and vice versa M1 is off for a time equal to the remaining part of the switching period Ts; vice versa, the gate terminals of the four switches M1, M2, M3 and M4 are controlled so that, during the time interval in which the voltage of grid 2 presents negative values with respect to the polarity indicated in FIG. 3, M2 is closed (i.e. conducting), M4 and M1 are open (i.e., not conducting) while M3 is closed and open with period Ts, so that M3 is conducting during the first part of the switching period Ts, of length equal to the product of the switching duty-cycle multiplied by the switching period Ts, and vice versa M3 is off for a time equal to the remaining part of the switching period Ts.

The gate terminals of the switches M1, M2, M3 and M4 receive the corresponding control signals from a logic circuit 11 (by way of example implemented with two AND gate and an inverting NOT gate) that receives as inputs a signal of synchronisation with the voltage $v_0(t)$ of the grid 2 and the signal of the direct output Q of a level-triggered SR-type flip-flop 12, the input S of which is connected to a clock generator 13 at frequency $fs=1/Ts$. The input R of the flip-flop 12 receives the output signal of a comparator 14, the non inverting input of which receives the absolute value of the voltage drop on the sensing resistor Rs (i.e. $|R_s*i_o|$), and the inverting input of which receives the sum of the signal coming from the resettable integrator 9 and the absolute value of the voltage $v_o(t)$ of the grid 2 (i.e. $|K*v_o|-v_m*t/T_s$, wherein $v_m$ is expressed by equation [6]). In particular, the resettable integrator 9 (that is effectively reset by the complementary output $\overline{Q}$ of the flip-flop 12, i.e. when $|R_s*i_o|>|K<|*v_o|-v_m*t/T_s$ and, hence, the output of the comparator 14 is high) integrates the difference (that is always a positive value, due to the [21]) between the voltage vg of the photovoltaic field 1 and the control voltage Vc. In this way, the flip-flop 12 adjusts the duty cycle of the signals for controlling the gates of the switches M1-M4.

The device of FIG. 3 has the following values of the parameters: $C_b=3$ mF; L=1.65 mH; $V_o=110$ Vrms; grid frequency $f_{grid}=60$ Hz; inverter switching frequency $f_s=33$ kHz, with switching period $T_s=1/f_s$, the photovoltaic field 1 is composed by sixteen panels connected in series, each one with maximum power voltage within the range [14, 16]V; panel temperature equal to ambient temperature, T=310K; voltage vg of the photovoltaic field 1 at the inverter input belonging to the range [220,260]V; peak voltage $V_{o,max}$ of the inverter output voltage $V_{o,max}=\sqrt{2}\cdot V_o\approx156$V; saturation voltage of the operational amplifiers used for the integrator 9 and for making the adders and the sensors of the circuit 10 $V_{op,sat}=24$V; $\alpha=1.3$; $\gamma=0.05$.

The search space SP of the set of the values of the parameters is defined in Table I. The search range for the sensing resistance $R_s$ is defined so as to prevent saturation phenomena of the operational amplifiers.

TABLE I

| K | $K_g$ | $R_s [\Omega]$ |
|---|---|---|
| $[0, V_{op,sat}N_{o,max}]$ | $[0, V_{op,sat}/V_{g,max}]$ | $\{0, (V_{op,sat} \cdot V_o)/[\sqrt{2}/P_{g,MPP}(S_{max})]\}$ |
| [0, 0.15] | [0, 0.07] | [0, 1.965] |

| $V_c$ [V] | $\tau = R_1 C_1$ [µs] | S [W/m$^2$] |
|---|---|---|
| $[0, V_{op,sat}]$ | $[0.01 \cdot T_s, T_s]$ | $[S_{min}, S_{max}]$ |
| [0, 24] | [0.3, 30.3] | [100, 1000] |

Figure 4:
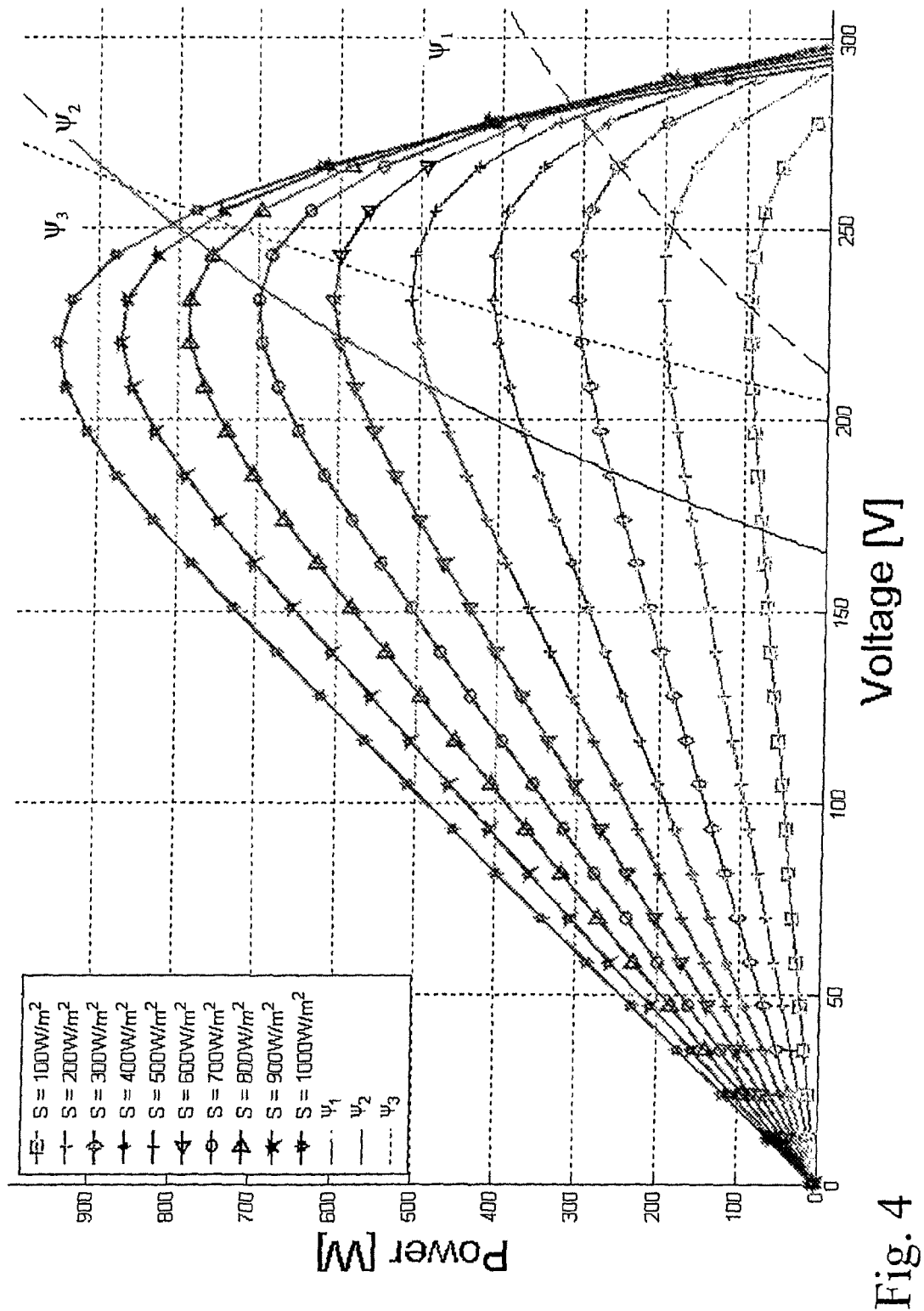
FIG. 4 shows the output power-voltage characteristic curves of the device of FIG. 3.

FIG. 4 shows the power curves of the photovoltaic field 1 corresponding to ten levels of sunlight S, and the three operation curves $P_o(V_g)$ of the photovoltaic OCC inverter corresponding to the three sets of values of the design parameters ensuring the minimum values of the three merit figures $\psi_1$, $\psi_2$, and $\psi_3$, obtained after an estimation with the Montecarlo method with $2 \cdot 10^5$ trials for each one of the three merit figures described above. Table II summarises the values of the parameters corresponding to the three design solutions which minimise the three merit figures $\psi_1$, $\psi_2$, and $\psi_3$ and the corresponding power levels obtained at maximum and minimum sunlight.

As expected, the inverter characteristic curve $P_0(V_g)$ obtained by minimising the first merit figure $\psi_1$ corresponds to an design solution that is unsatisfactory at high levels of sunlight S, while the other two solutions present better, although not optimal, performance.

TABLE II

|  | K | $K_g$ | $R_s$ [Ω] |
|---|---|---|---|
| $\Psi_1$ | 0.036405 | 0.0013691 | 0.36847 |
| $\Psi_2$ | 0.031513 | 0.0096176 | 0.30655 |
| $\Psi_3$ | 0.024794 | 0.0528300 | 0.24229 |
|  | $V_c$ [V] | $R_1C_1$ [μs] | Output Power [W] | |
| $\Psi_1$ | 5.4465 | 20.188 | $P_o(S_{max})$ = 309.856 | $P_o(S_{min})$ = 91.832 |
| $\Psi_2$ | 3.4271 | 10.660 | $P_o(S_{max})$ = 794.108 | $P_o(S_{min})$ = 76.932 |
| $\Psi_3$ | 15.7446 | 29.394 | $P_o(S_{max})$ = 769.943 | $P_o(S_{min})$ = 89.970 |

Figure 5:
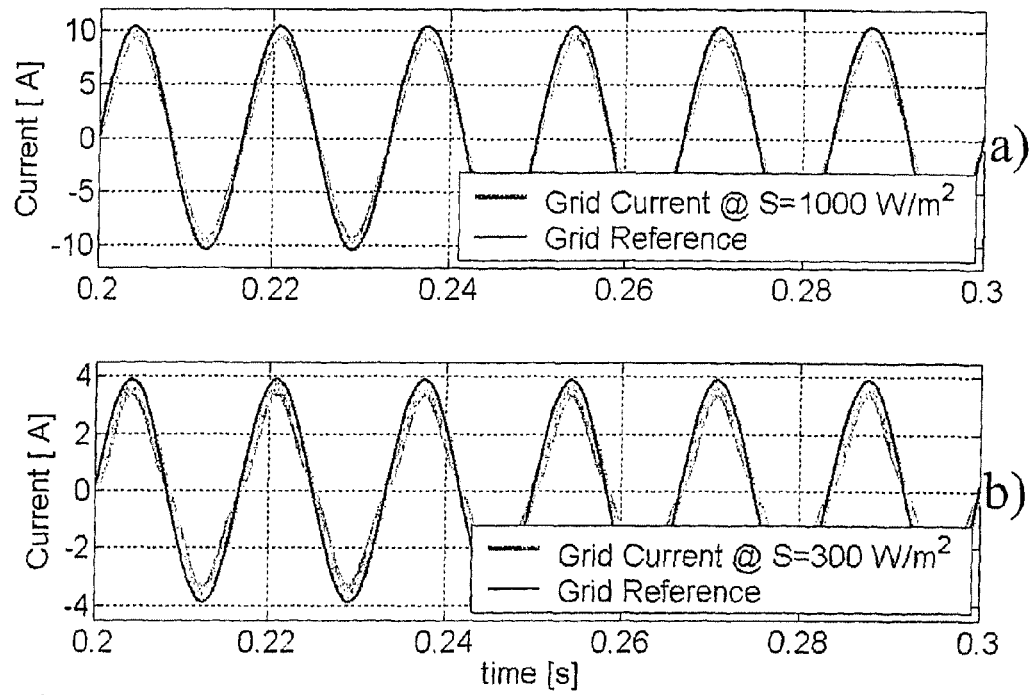
FIG. 5 shows the output currents from the device of FIG. 3 in two respective operation conditions.

The waveforms of the inverter output currents, compared with the reference waveform of the grid voltage, shown in FIG. 5, obtained through circuit simulation performed by using the software PSIM®, shows the high PF-out attained at both high and low levels of sunlight S (respectively, FIG. 5a and FIG. 5b) with the set of parameter values minimising the second merit figure $\psi_2$.

Figure 7:
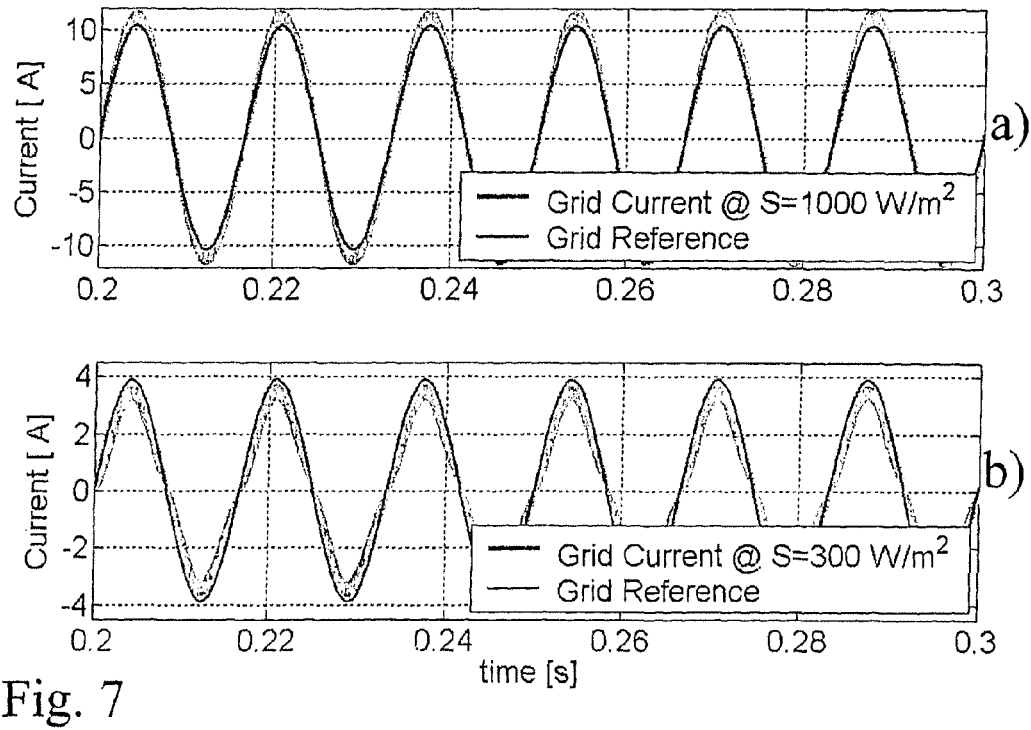
FIG. 7 shows the output currents from the device having the characteristic curves of FIG. 6 in two respective operation conditions.
Figure 6:
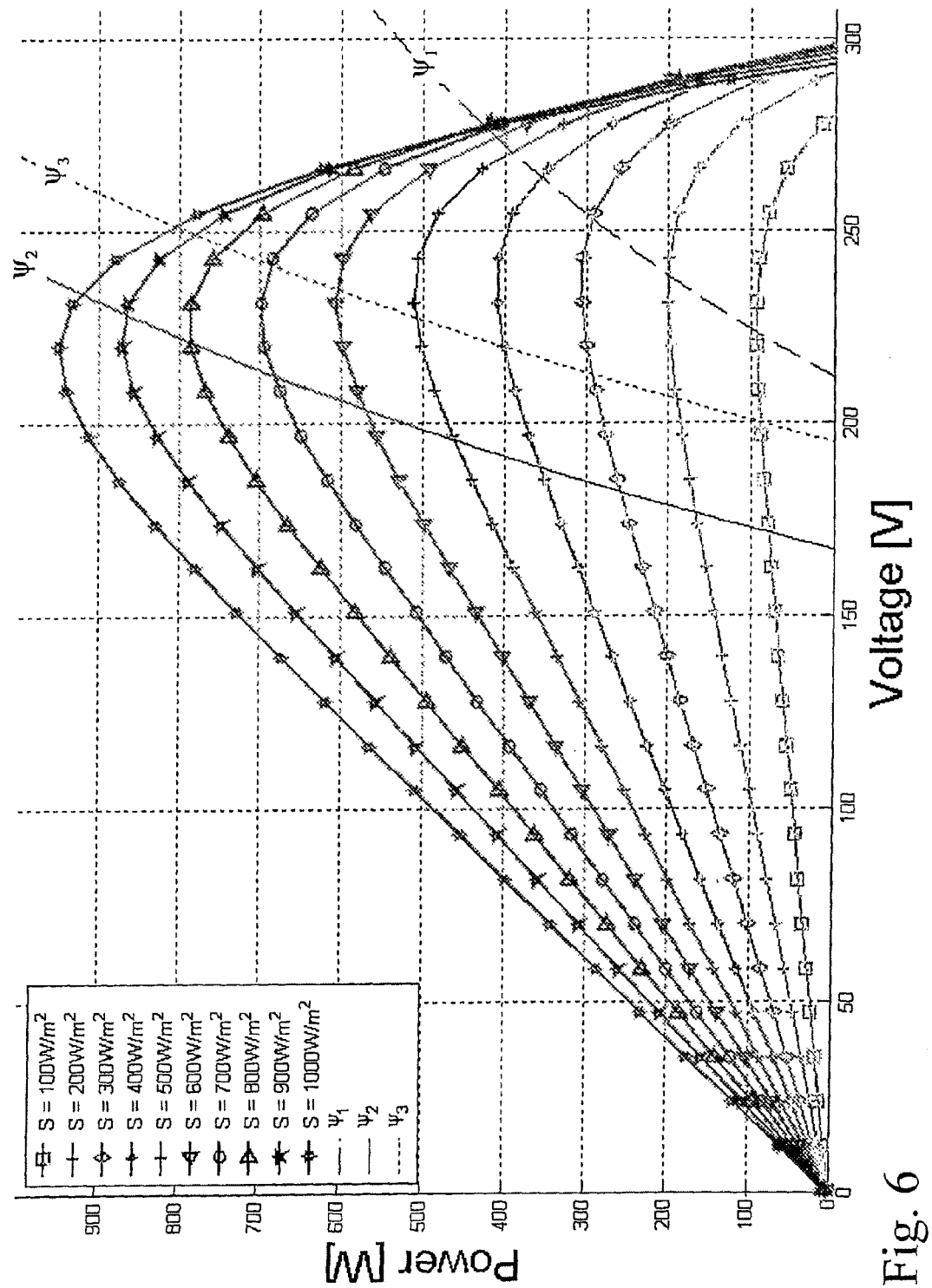
FIG. 6 shows the output power-voltage characteristic curves of the device of FIG. 3, having a second scaling of parameters.

The solutions summarised in Table II may be improved if a larger number of trials in the Montecarlo method is used. For instance, with $8 \cdot 10^5$ trials, the solutions summarised in Table III are obtained, while FIG. 6 shows the corresponding three operation curves $P_o(V_g)$ of the photovoltaic OCC inverter (superimposed on the power curves of the photovoltaic field 1 corresponding to ten levels of sunlight S), and FIG. 7 shows the simulated waveforms of the inverter output currents, compared with the reference waveform of the grid voltage, corresponding to the set of parameter values minimising the second merit figure $\psi_2$ (FIG. 7a for high sunlight levels and FIG. 7b for low levels of sunlight S).

As expected, the maximum output powers are higher with respect to the preceding case for each one of the three optimal solutions determined with the three merit figures.

TABLE III

|  | K | $K_g$ | Rs [Ω] |
|---|---|---|---|
| $\Psi_1$ | 0.023410 | 0.0056853 | 0.21366 |
| $\Psi_2$ | 0.056368 | 0.0577370 | 0.55243 |
| $\Psi_3$ | 0.031339 | 0.049305 | 0.30907 |
|  | $V_c$ (V) | $R_1C_1$ [μs] | Output power [W] | |
| $\Psi_1$ | 4.6276 | 20.901 | $P_o(S_{max})$ = 419.7095 | $P_o(S_{min})$ = 92.0455 |
| $\Psi_2$ | 16.0471 | 20.571 | $P_o(S_{max})$ = 887.4122 | $P_o(S_{min})$ = 76.8944 |
| $\Psi_3$ | 14.7741 | 25.555 | $P_o(S_{max})$ = 791.5862 | $P_o(S_{min})$ = 87.3512 |

Figure 8:
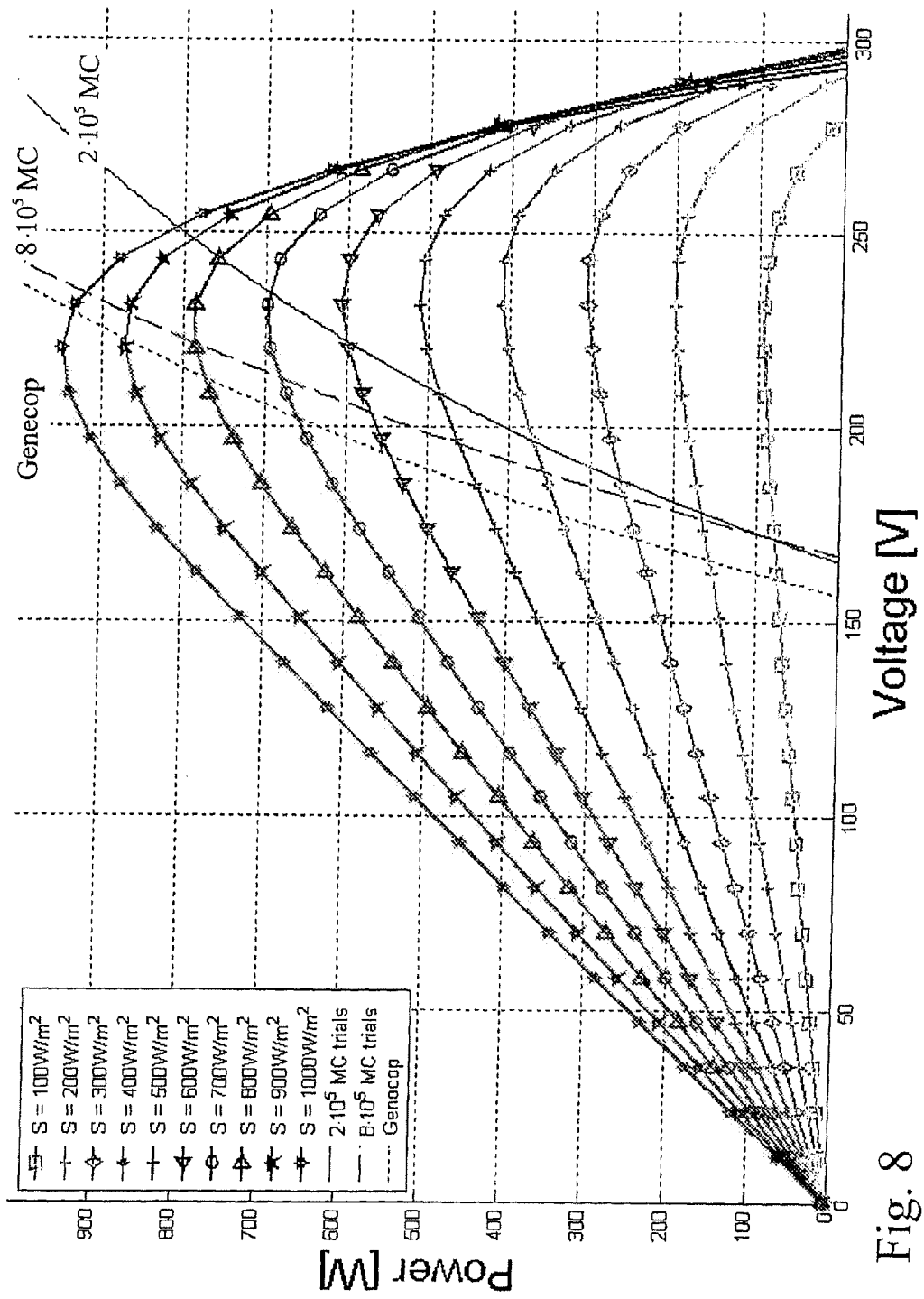
FIG. 8 shows the output power-voltage characteristic curves of the device of FIG. 3, having a third scaling of parameters.

The inventors have attained further improvements by using evolutionary type search algorithms, such as for instance genetic algorithms. In this regard, Table IV summarises the values of the optimal sets of parameters minimising the second merit figure $\psi_2$ obtained by means of the two previous Montecarlo methods and the values of the set obtained through the known genetic algorithm Genocop, while FIG. 8 shows the corresponding operation curves $P_o(V_g)$ of the photovoltaic OCC inverter.

TABLE IV

|  | K | $K_g$ | $R_s$ [Ω] |
|---|---|---|---|
| $2 \cdot 10^5$ MC trials | 0.031513 | 0.0096176 | 0.30655 |
| $8 \cdot 10^5$ MC trials | 0.056368 | 0.0577370 | 0.55243 |
| Genetic algorithm | 0.031161 | 0.01327885 | 0.305412 |
|  | $V_c$ [V] | $R_1C_1$ [μs] | Output power [W] |
| $2 \cdot 10^5$ MC trials | 3.4271 | 10.660 | $P_o(S_{max})$ = 794.1080 |
| $8 \cdot 10^5$ MC trials | 16.0471 | 20.571 | $P_o(S_{max})$ = 887.4122 |
| Genetic algorithm | 3.6291 | 9.570 | $P_o(S_{max})$ = 916.5764 |

Figure 9:
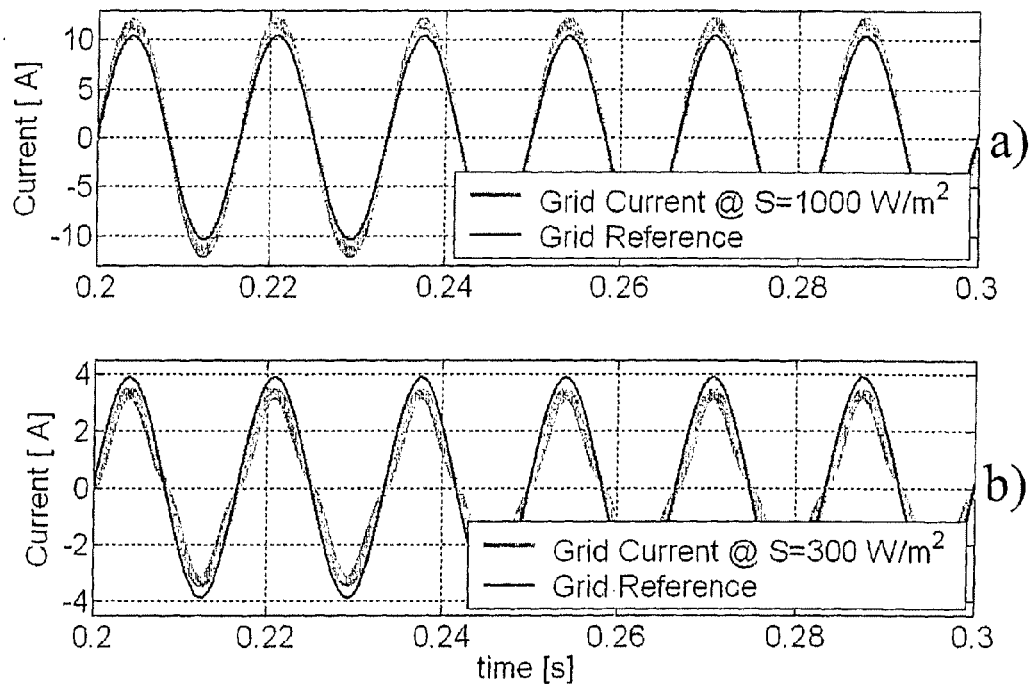
FIG. 9 shows the output currents from the device of FIG. 3 having the third scaling of parameters in two respective operation conditions.

FIG. 9 shows the simulated waveforms (for high and low levels of sunlight S, respectively in FIGS. 9a and 9b) of the inverter output currents, compared with the reference waveform of the grid voltage, corresponding to such set of the parameter values obtained through genetic optimisation, which show the high PF-out factor with an extremely low percentage value of total harmonic distortion, equal to THD %=3.5178.

Figure 10:
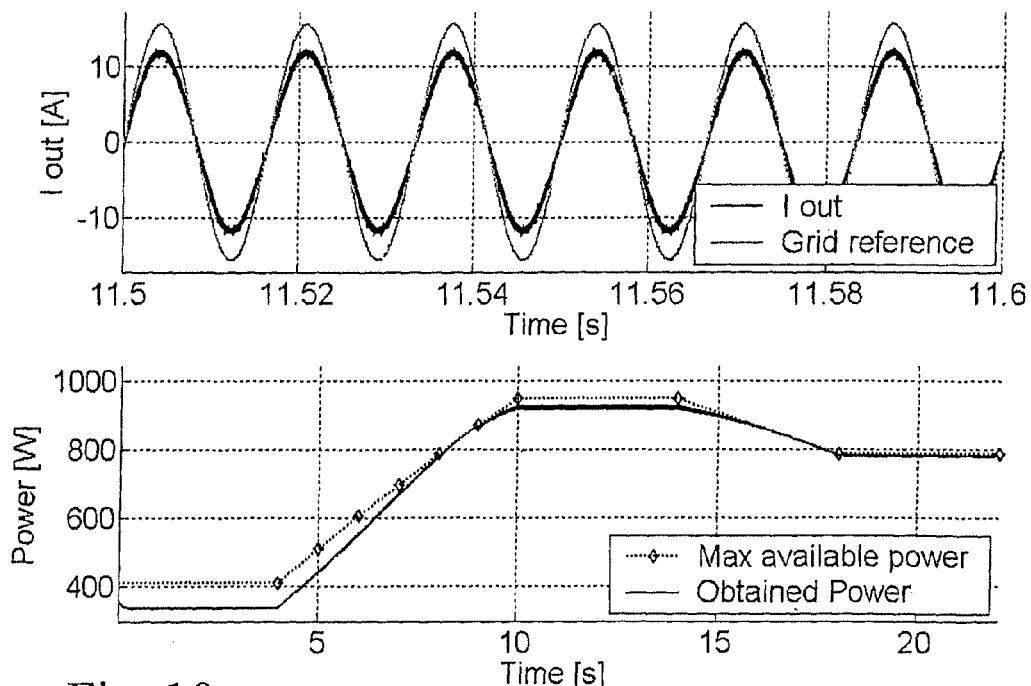
FIG. 10 shows first graphs of the dynamic performance of the device of FIG. 3 having the third scaling of the parameters in variable operation conditions.
Figure 11:
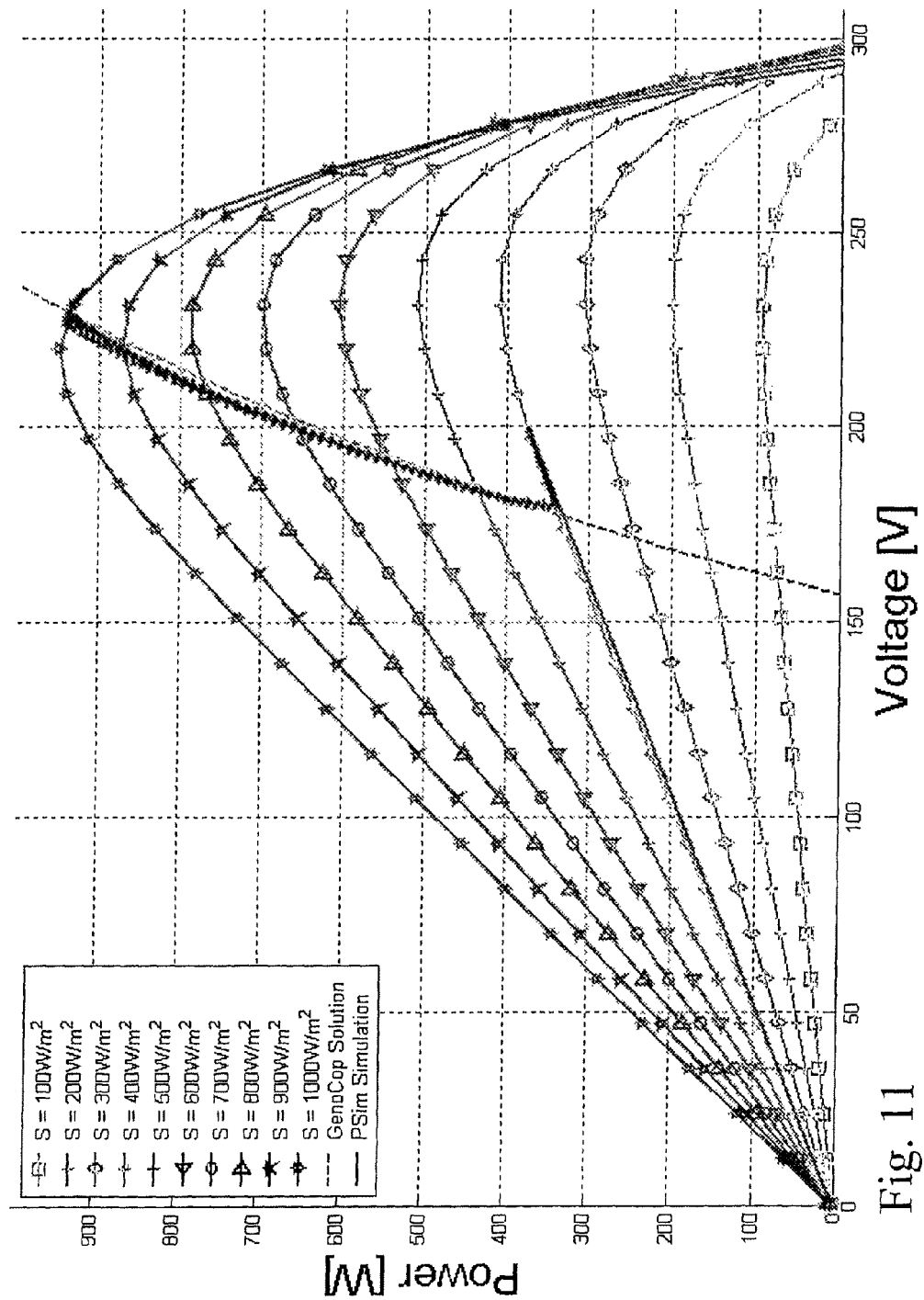
FIG. 11 shows a second graph of the dynamic performance of the device of FIG. 3 having the third scaling of the parameters in variable operation conditions.

FIGS. 10 and 11 instead show the simulated dynamic behaviour of the inverter corresponding to such set of the parameter values obtained through genetic optimisation in the maximum power point tracking in presence of sunlight S variable during a time interval equal to about 20 seconds. In particular: FIG. 10a shows the inverter output current, compared with reference waveform of the grid voltage, in correspondence with the sub-interval of time ranging from 11.5 seconds to 11.6 seconds; FIG. 10b shows a comparison between output power Po effectively obtained from the photovoltaic field 1 and the maximum power deliverable from the same field 1 (real maximum power point) during the whole time interval (from the initial instant t=0 to the instant equal to about 22 seconds); FIG. 11 shows the corresponding shift, during the same time interval, of the operation point over the inverter output power-voltage characteristic curves.

Figure 12:
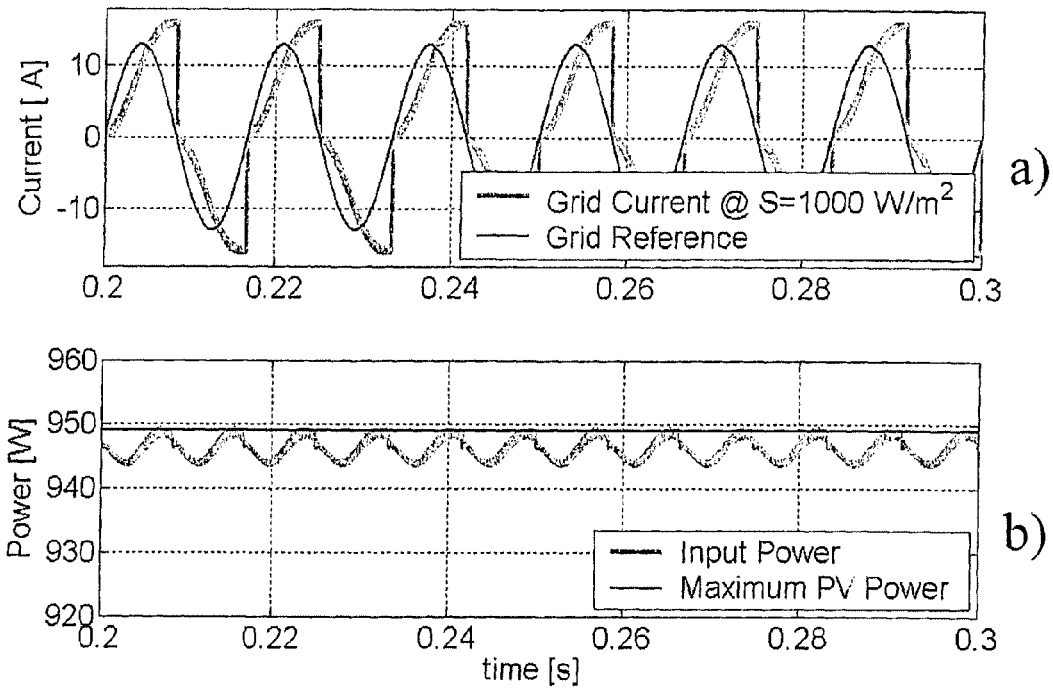
FIG. 12 shows graphs of the performance of a first device not according to the invention.
Figure 13:
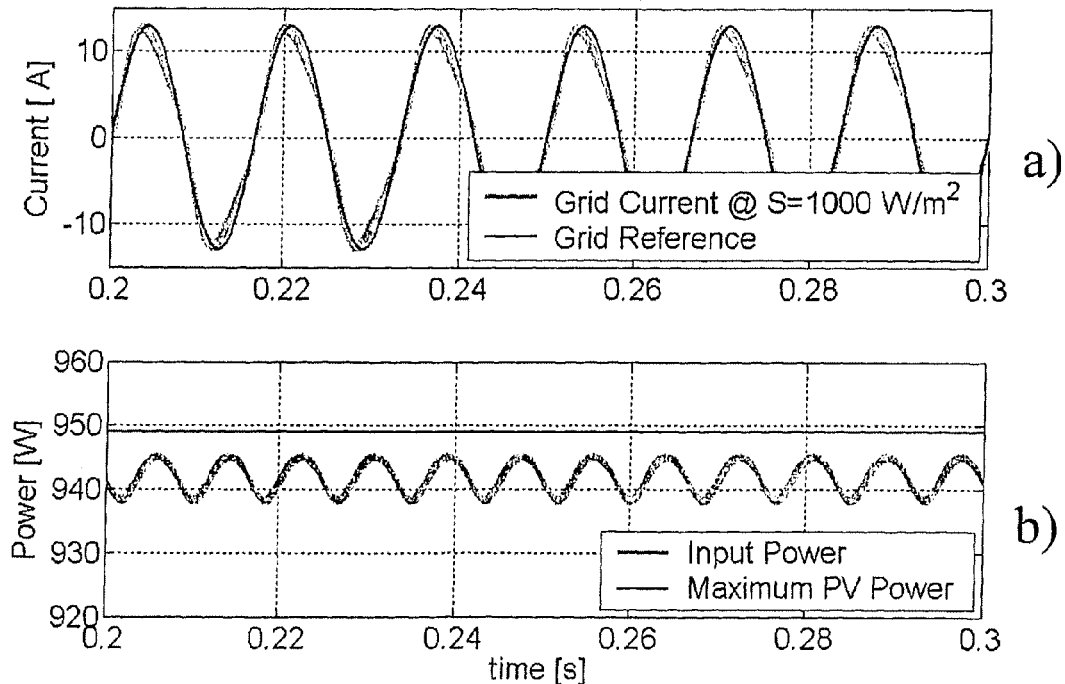
FIG. 13 shows graphs of the performance of a second device not according to the invention.

In order to point out the fundamental contribution of the new constraints, in particular of that represented by equation [30], the inventors have carried out a test searching the set of inverter parameter values related to the minimisation of the second merit figure $\psi_2$ without the constraint [30]. Two sets of obtained parameter values are summarised in Table V and in Table VI. Each one of FIGS. 12 and 13 shows the two simulated waveforms (figures a) and b), respectively) of the output current io(t) (compared with the reference waveform of the grid voltage) and of the inverter average output power $P_0$ (compared with the maximum power of the photovoltaic field 1), in conditions of maximum sunlight $S_{max}$, having the sets of the parameters of Table V (FIG. 12) and Table VI (FIG. 13).

TABLE V

|  | K | $K_g$ | Rs [Ω] |
|---|---|---|---|
| $\Psi_2$ | 0.094218 | 0.0070186 | 0.0063001 |
|  | $V_c$ [V] | $R_1C_1$ [μs] | Output power [W] | |
| $\Psi_2$ | 13.8066 | 17.95 | $P_o(S_{max})$ = 948.7253 | $P_o(S_{min})$ = 91.9232 |

TABLE VI

|  | K | $K_g$ | Rs [Ω] |
|---|---|---|---|
| $\Psi_2$ | 0.0084562 | 0.061429 | 0.046981 |

|  | $V_c$ (V) | $R_1C_1$ [µs] | Output power [W] | |
|---|---|---|---|---|
| $\Psi_2$ | 14.7295 | 21.95 | $P_o(S_{max})$ = 939.5787 | $P_o(S_{min})$ = 91.7853 |

It should be noted that in FIG. 12 the value of the inverter average output power $P_0$ scaled by using the results summarised in Table V at the maximum level of sunlight $S=S_{max}$ in FIG. 12b is very close to the maximum power $P_{g,MPP}(S_{max})$ of the photovoltaic field 1, but the distortion level of the current of FIG. 12a is practically inadmissible (THD %=31.4). Vice versa, FIG. 13 shows that the inverter scaled by using the results summarised in Table VI provides an average output power $P_0$ (see FIG. 13b) significantly lower than the photovoltaic maximum $P_{g,MPP}(S_{max})$, against a better PF out (see FIG. 13a).

This shows that the fulfilment of constraint [30] is generally indispensable for simultaneously attaining high output powers $P_0$ and high PF-out.

Figure 14:
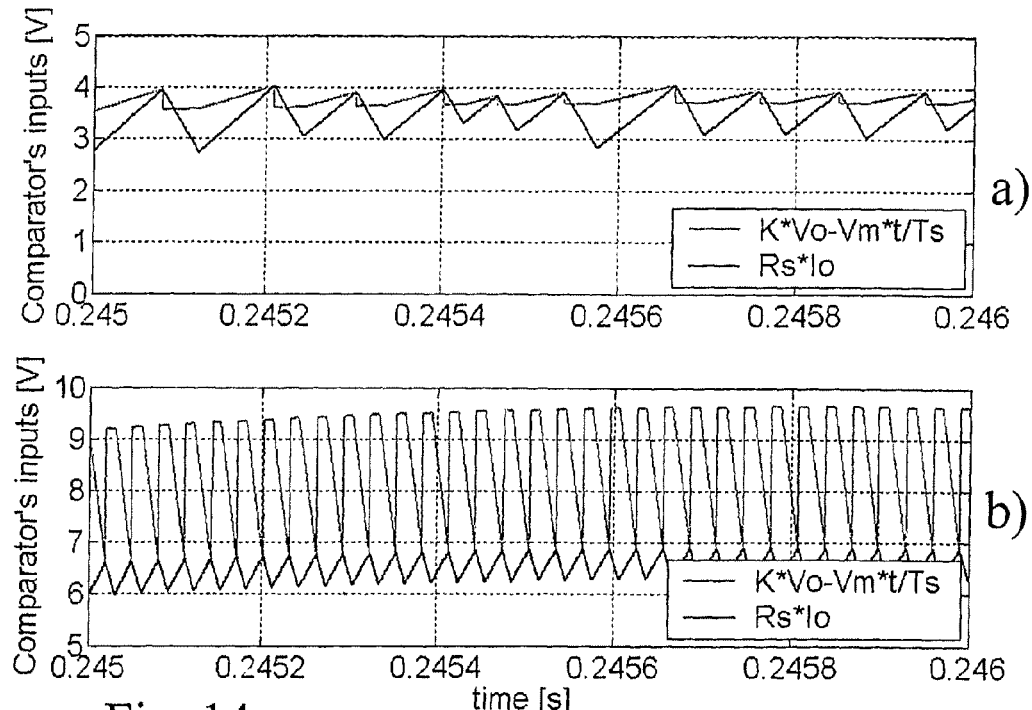
FIG. 14 shows third graphs of signals internal to the device of FIG. 3 having the third scaling of the parameters compared with similar signals internal to a third device not according to the invention.
Figure 15:
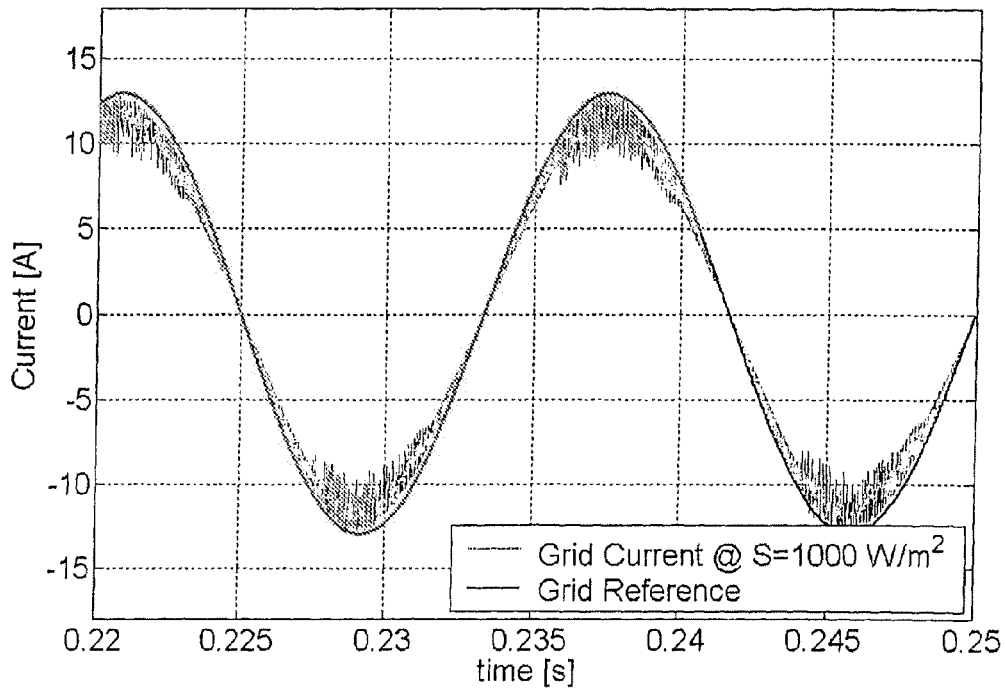
FIG. 15 shows a graph of the performance of the third device not according to the invention.

The inventors have carried out a similar test in relation to the constraint represented by equation [14]. FIG. 14 shows the waveforms of the two inputs of the comparator 14 of FIG. 3 in cases of violation (FIG. 14a) and of fulfilment (FIG. 14b) of the constraint [14]: in the first case, the phase inversion of the voltage at the non inverting input terminal of the comparator 14 does not allow the periodic operation at fixed switching frequency $f_s$, instead occurring in the second case, and it determines a strong distortion of the output current $i_o(t)$, as shown in FIG. 15.

Differently from what proposed by Chen and Smedley, the device developed by the inventors is not scaled so as to meet the following constraint:

$$V_m > K \frac{V_{o,max}}{D_{max}} \quad (34)$$

where $D_{max}$ is the maximum value of the duty-cycle admissible for the circuit.

In fact, while such constraint is necessary in the device proposed by Chen and Smedley for ensuring the existence of the conditions for resetting the integrator 9 of FIG. 2 in every switching cycle, even if the output current $i_o(t)$ is equal to zero, in the device according to the invention the above is ensured by the use of the level-triggered flip-flop 12 of FIG. 3. Furthermore, it is preferable that the determination of the set of parameters of the device according to the invention does not include the constraint [34], since otherwise the device shows performance considerably lower, especially in terms of fall of the output power $P_0$.

In particular, Table VII shows the set of parameters obtained after an estimation with the Montecarlo method with $8 \cdot 10^5$ trials for each one of the three merit figures described above and including the constraint [34].

TABLE VII

|  | K | $K_g$ | Rs [Ω] |
|---|---|---|---|
| $\Psi_1$ | 0.029192 | 0.016054 | 0.28945 |
| $\Psi_2$ | 0.069325 | 0.011318 | 0.65468 |
| $\Psi_3$ | 0.069325 | 0.011318 | 0.65468 |

TABLE VII-continued

|  | $V_c$ (V) | $R_1C_1$ [µs] | Output power [W] | |
|---|---|---|---|---|
| $\Psi_1$ | 9.6104 | 30.037 | $P_o(S_{max})$ = 430.0164 | $P_o(S_{min})$ = 92.0269 |
| $\Psi_2$ | 10.953 | 22.043 | $P_o(S_{max})$ = 538.4387 | $P_o(S_{min})$ = 82.871 |
| $\Psi_3$ | 10.953 | 22.043 | $P_o(S_{max})$ = 538.4387 | $P_o(S_{min})$ = 82.871 |

Figure 16:
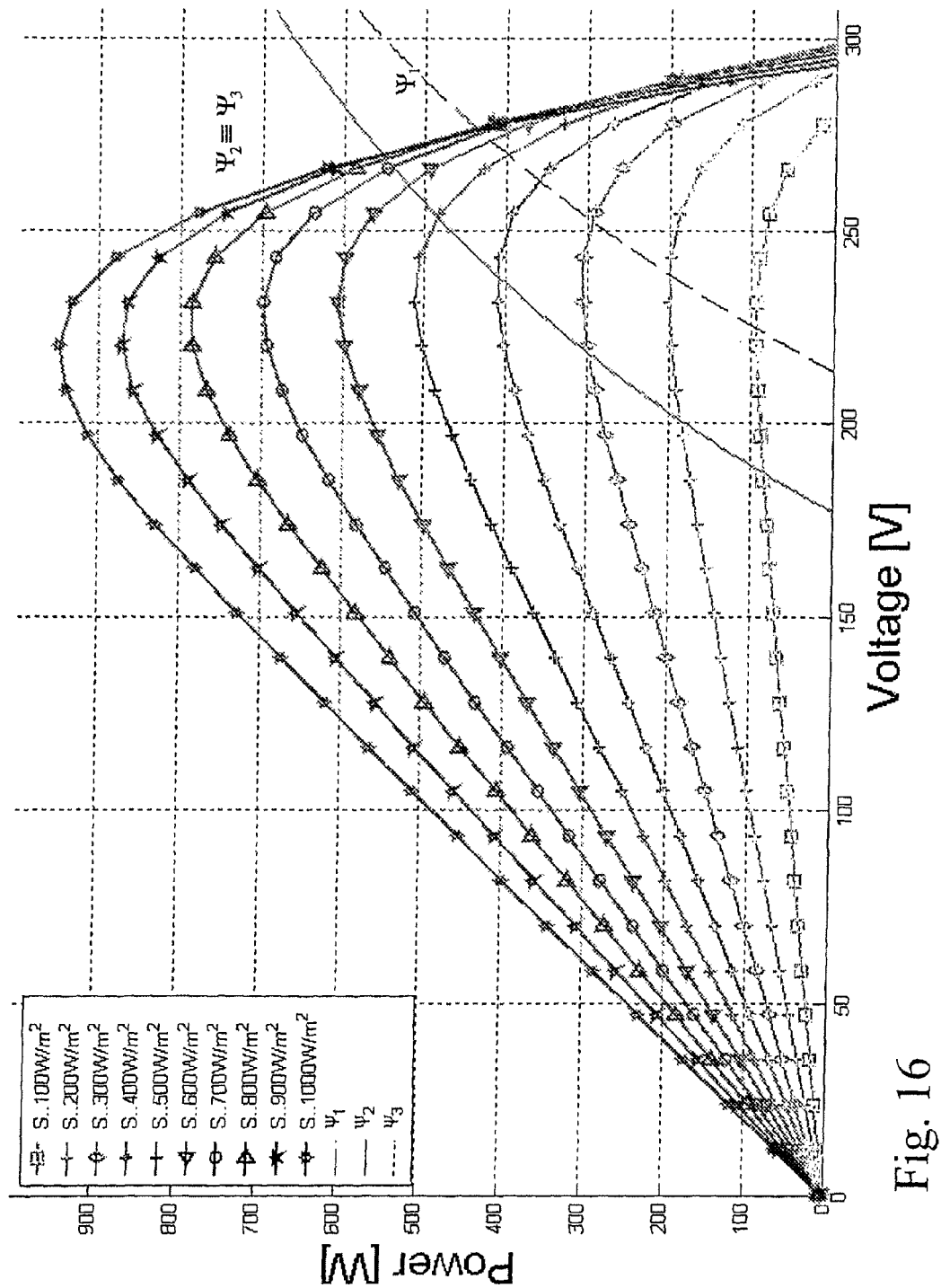
FIG. 16 shows a graph of the performance of a fourth device not according to the invention.
Figure 17:
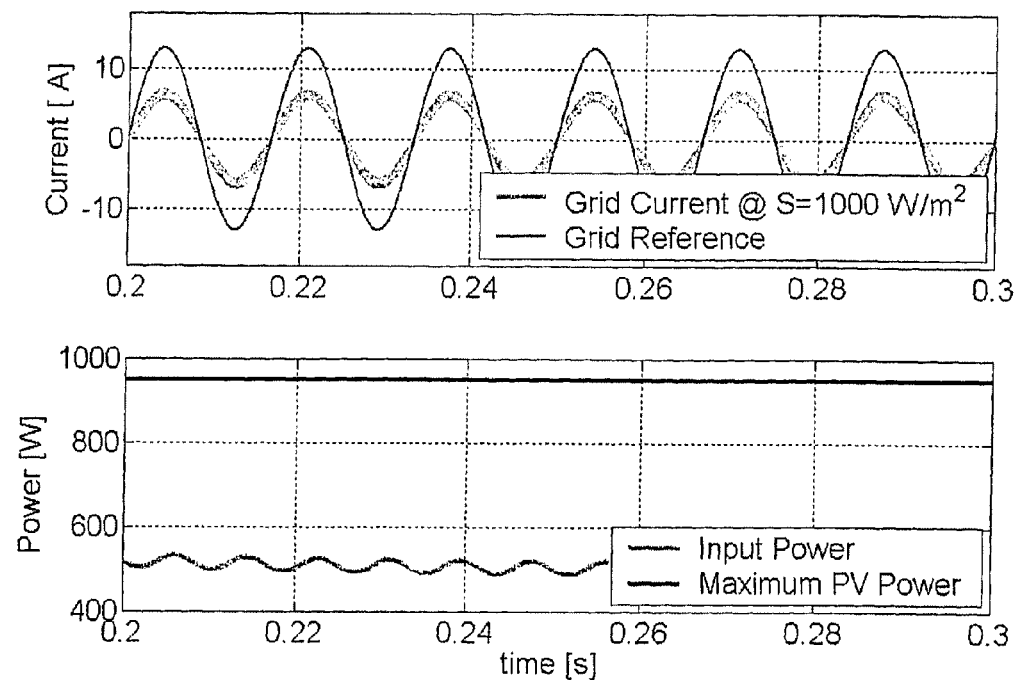
FIG. 17 shows graphs of the performance of the fourth device not according to the invention.

FIG. 16 shows the output power-voltage characteristic curves of the inverter with the set of the parameter values of Table VII minimising the merit figures $\psi_1$, $\psi_2$, $\psi_3$ while FIGS. 17a and 17b show the simulated waveform, respectively, of the output current io(t) of such inverter (compared with the reference waveform of the grid voltage) and of the inverter output power $P_0$ (compared with the maximum power of the photovoltaic field 1), under conditions of maximum sunlight $S=S_{max}$ with the set of the parameter values of Table VII minimising the merit figure $\psi_2$. It may be observed that while the PF-out level is good, the level of extracted power $P_0$ is significantly lower than the maximum value deliverable by the photovoltaic field 1, that is on the contrary substantially obtainable by eliminating the constraint [34].

The photovoltaic single stage inverter device shown in FIG. 3 allows to attain a significant improvement in terms of performance both for the power part and for the control part, at low cost, since the controller 10 is implementable through analog circuitry with parameters optimised through the described process imposing the constraints represented by equations [13], [14], [21], [23] and [30], and minimising the three merit figures $\psi_1$, $\psi_2$, and $\psi_3$ represented by equations [31]-[33].

The operation point of the inverter device of FIG. 3 in terms of output power as a function of the voltage vg(t) of the photovoltaic field 1 remains moving along a fixed path, identified by the set of parameters $\{K, K_g, R_s, V_c, \tau\}$, intersecting the maximum power point of the photovoltaic field only in particular environmental conditions, remaining in the proximity of it in the other cases, at a distance depending on the level of instant sunlight S and on the instant temperature T. This is inevitable because there is no design solution with a set of fixed values of the parameters $\{K, K_g, R_s, V_c, \tau\}$ ensuring that the inverter output power characteristic curve overlaps the locus of the maximum power points of the photovoltaic field under the variation of the sunlight S and the temperature T of the panels within their respective range of operation values $[S_{min}, S_{max}]$ and $[T_{min}, T_{max}]$.

Figure 18:
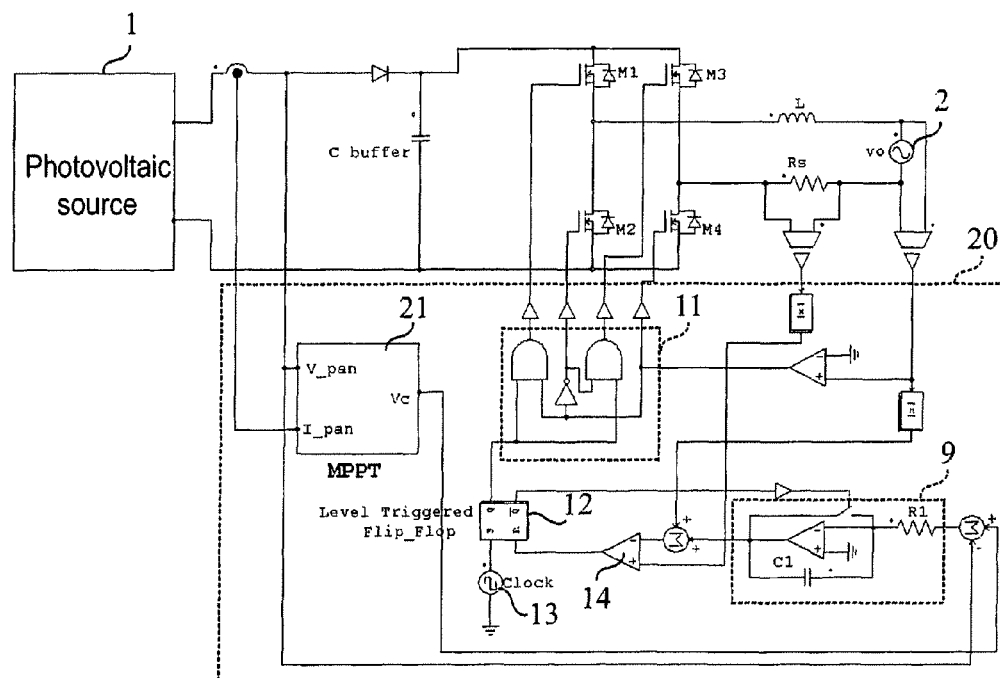
FIG. 18 shows a second embodiment of the device according to the invention.

With reference to FIG. 18, a second embodiment of the device according to the invention integrates in a different controller 20 the analog controller 10 of FIG. 3 with a digital unit 21, achieving a function of the perturb and observe or P&O type and operating on the OCC controller parameters in order to attain the real maximum power point tracking MPPT.

In general, the P&O MPPT technique perturbs the operation voltage vg(t) of the photovoltaic field 1 according to the so called hill climbing method. According to such method, the voltage vg(t) is perturbed in a given direction (i.e., by either increasing or decreasing it), through a variation of the duty-cycle value of the inverter of the converter connected with its input to the photovoltaic field 1 and with its output to the grid 2. The instant output voltage and current of the photovoltaic field 1 are detected by the digital unit 21 that evaluates their product (i.e., the field output electric power): if this is higher than that detected after the last preceding perturbation, then the voltage vg(t) is furthermore varied in the same direction, otherwise the direction of perturbation of the voltage vg(t) is reversed.

In the device of FIG. 18, the P&O MPPT technique is applied to the perturbation of the sole parameter $V_c$, that along with the other ones determine the behaviour of the inverter output power P0 curve, thus making such curve dynamic and in this way achieving the possibility of obtaining an intersection between the aforesaid curve and the characteristic curve of the photovoltaic field power $P_g$ in correspondence with the maximum power point MPP, in any conditions of sunlight S and panel temperature T.

However, other embodiments of the device according to the invention may apply the P&O MPPT technique to the perturbation of one or more of the five parameters ($K$, $K_g$, $R_s$, $V_c$, $\tau$) of the inverter or of any combination of two or more of them.

The efficiency of the P&O MPPT technique may be maximised by suitably setting the period $T_a$ of sampling the voltage vg(t) and the current ig(t) of the photovoltaic field 1 (with $T_a > T_s$) and the amplitude $\Delta d$ of the duty-cycle perturbation. The sampling period $T_a$ must be chosen as a function of the dynamics of the whole system given by the assembly constituted by the photovoltaic field 1 and the converter comprising the inverter, in order to avoid mistakes in MPPT tracking. The correct setting of duty-cycle perturbation amplitude $\Delta d$ also prevents the operating point of the photovoltaic field 1 from oscillating around the MPP maximum power point, and allows to optimise the response speed of the controller 20 under fast variations of sunlight S.

In particular, the device of FIG. 18 has as set of starting parameter values the one summarised in Table IV obtained through the known genetic algorithm Genocop, the digital unit 21 operating according to the illustrated P&O MPPT technique determining subsequent variations of the control voltage $V_c$ within the range 3.4091 V to 5.0489 V, fulfilling constraint equations [13], [14], [21], [23], and [30].

Figure 19:
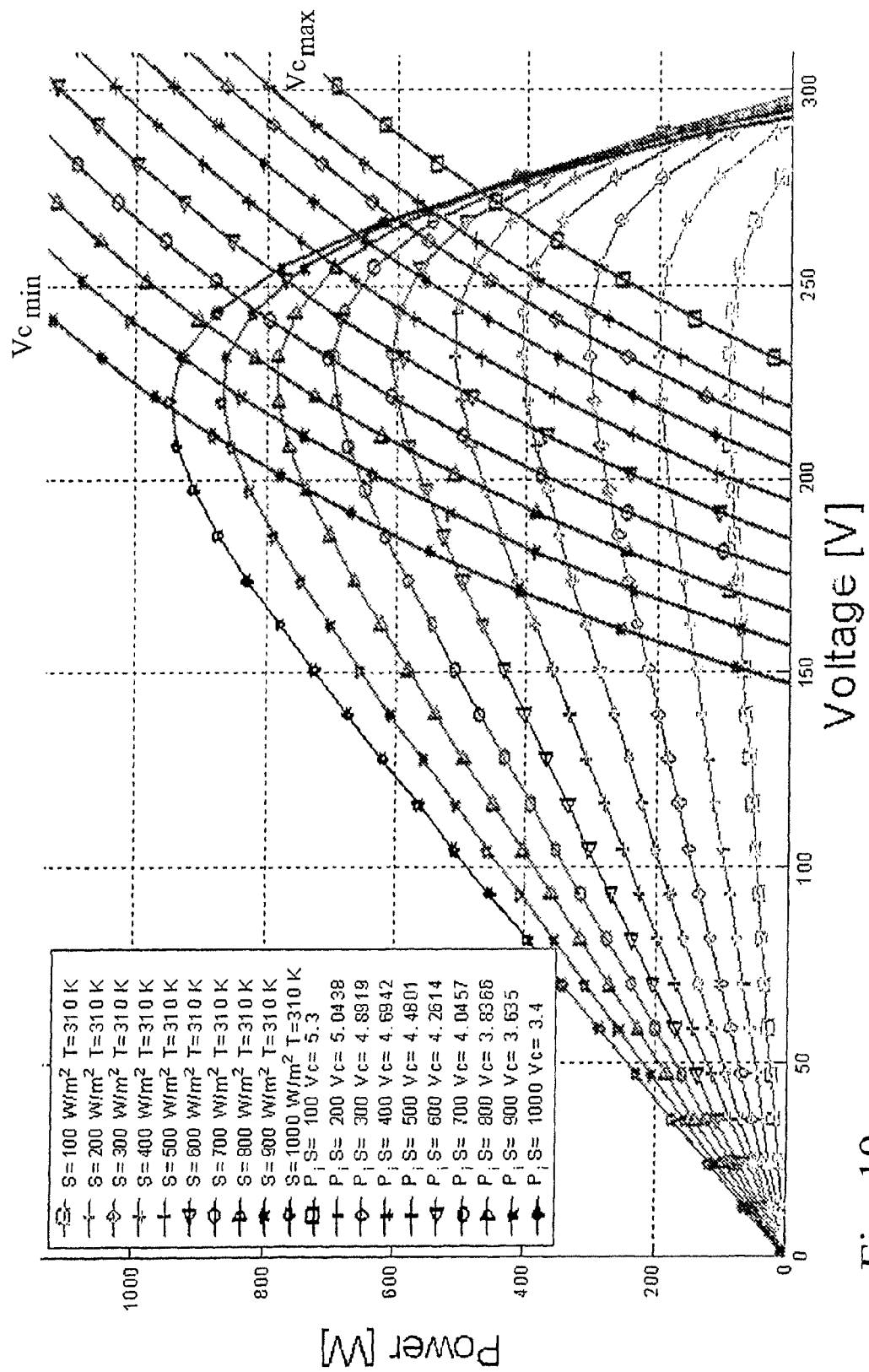
FIG. 19 shows the output power-voltage characteristic curves of the device of FIG. 18.

The locus of operation points corresponding to the inverter output power P0 obtainable by making the voltage $V_c$ vary within the range indicated above is shown in FIG. 19, and it is in fact represented by the surface delimited by the two extreme curves corresponding to the two minimum and maximum values $V_{c\_min}$ and $V_{c\_max}$ of the voltage $V_c$. Such surface includes all the possible MPP maximum power points of the photovoltaic field 1 within the range of considered values of sunlight S (belonging to the range 100 W/m² to 1000 W/m²).

The circuit of FIG. 18 is optimised, in terms of values of the sampling period $T_a$ and of the amplitude $\Delta V_c$ of the perturbation of the voltage $V_c$ (i.e. of the amplitude $\Delta d$ of the perturbation of the inverter duty-cycle d(t)) by applying the criteria indicated by N. Femia, G. Petrone, G. Spagnuolo, M. Vitelli, in the two papers "*Optimizing Sampling Rate of P&O MPPT Technique*" and "*Optimizing Duty-cycle Perturbation of P&O MPPT Technique*", presented at the Proc. of IEEE Power Electronics Specialist Conference, June 2004, Aachen (Germany), pp. 1945-1949, and pp. 1939-1944, respectively, approximately obtaining $T_a$=0.1 s, $\Delta V_c$=0.2 V.

Figure 20:
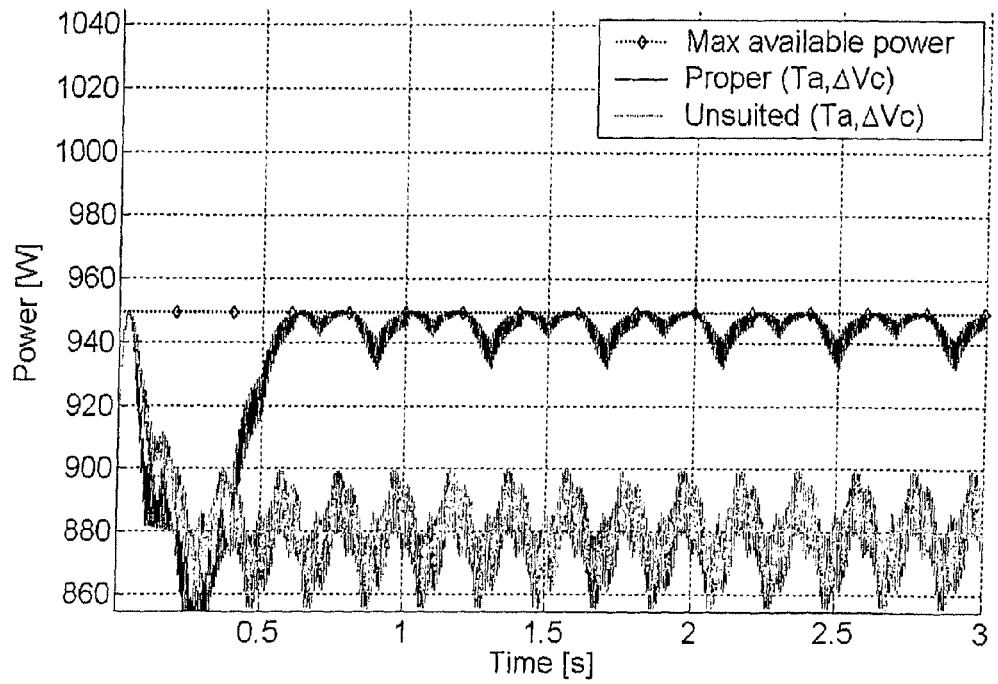
FIG. 20 shows a graph of the performance of the device of FIG. 18.
Figure 21:
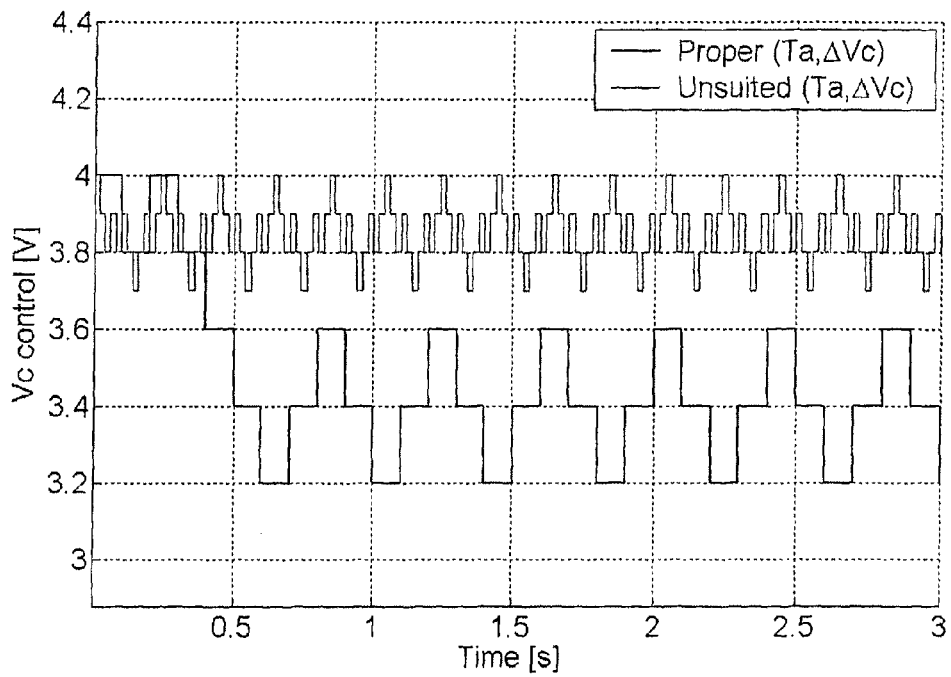
FIG. 21 shows a graph of signals internal to the device of FIG. 18.

FIG. 20 compares the output power $P_0$ of the P&O MPPT OCC photovoltaic inverter of FIG. 18, having panel temperature equal to the ambient temperature T=310 K, sunlight level S=1000 W/m², obtainable in the case when the values of the sampling period $T_a$ and of the perturbation amplitude $\Delta V_c$ are optimal $\{T_a, \Delta V_c\}$={0.1 s, 0.2 V} and in the case when they are not optimal $\{T_a, \Delta V_c\}$={0.02 s, 0.1 V}, with the maximum power available from the photovoltaic field 1. FIG. 21 shows the corresponding behaviours of the respective control voltages $V_c$. The better performance of the optimal case is self-evident.

Figure 22:
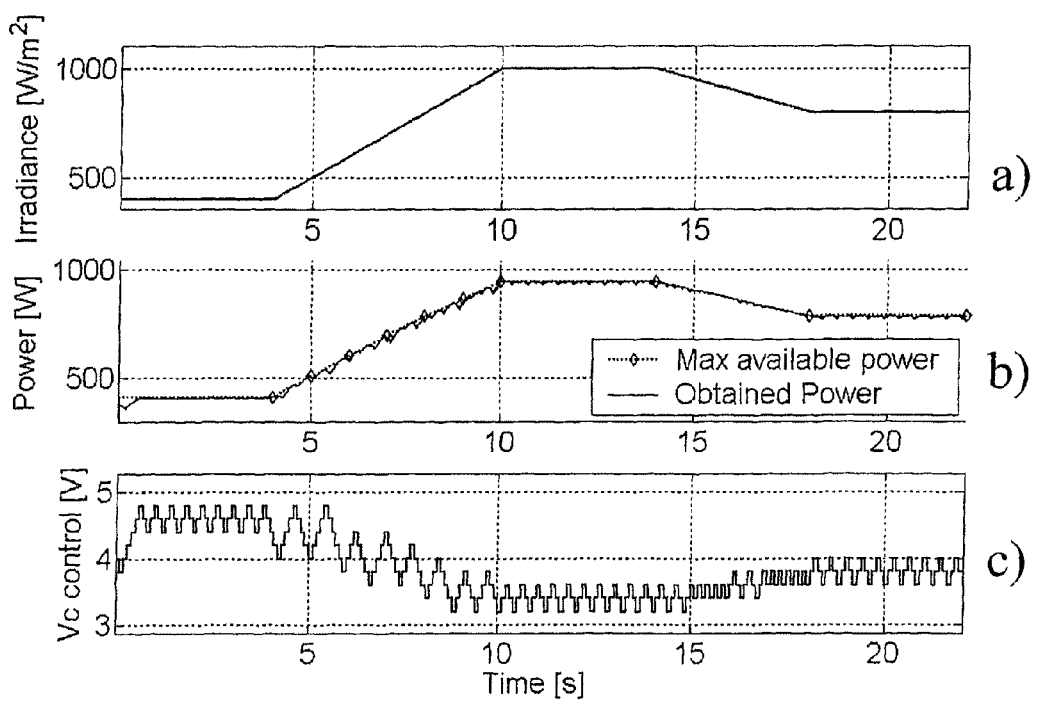
FIG. 22 shows graphs of the performance of the device of FIG. 18 in variable operation conditions.

FIG. 22 shows the dynamic performance of the P&O MPPT OCC photovoltaic inverter of FIG. 18 with $\{T_a, \Delta V_c\}$={0.1 s, 0.2 V}, for T=310 K, under conditions of variable sunlight (FIG. 22*a*), showing the consequent time behaviours of the output power $P_O$ (compared with the similarly variable maximum power available from the photovoltaic field 1, FIG. 22*b*), and of the control voltage $V_c$ (FIG. 22*c*).

Figure 23:
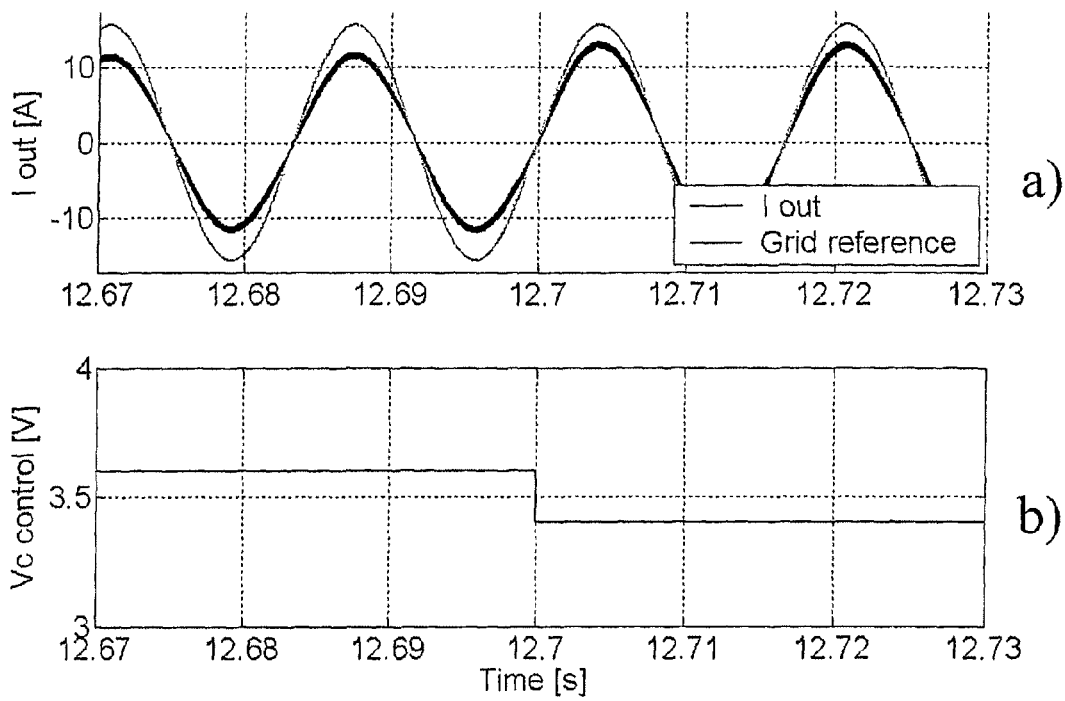
FIG. 23 shows a particular of the internal signals and the output current of the device of FIG. 18.

FIG. 23 shows the waveform of the output current io(t) (compared with the reference waveform of the grid voltage 2, FIG. 23*a*) and the time behaviour of the control voltage $V_c$ (FIG. 23*b*) in a time sub-interval of FIG. 22 ranging from 12.67 s to 12.73 s (wherein the control voltage $V_c$ is subjected to a variation), from which it is evident that the quality of the waveform of the output current io(t) is maintained thanks to the presence of the P&O MPPT control.

Figure 24:
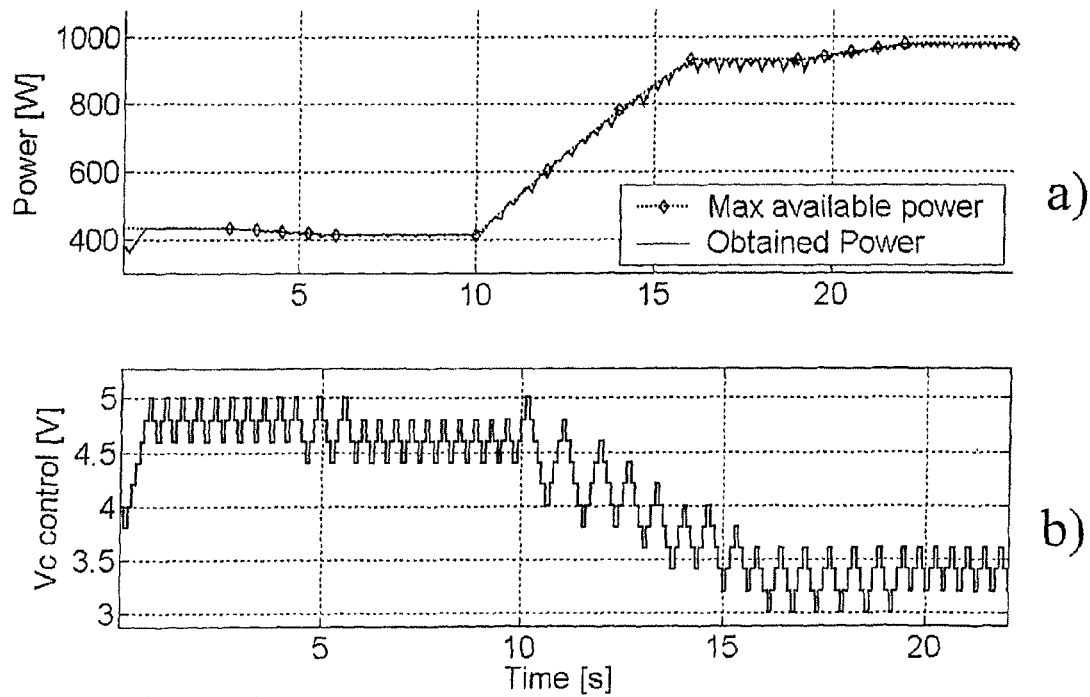
FIG. 24 shows further graphs of the performance of the device of FIG. 18 in variable operation conditions.

FIG. 24 shows the time behaviours of the output power $P_O$ (compared with the maximum power available from the photovoltaic field 1, FIG. 24*a*), and of the control voltage $V_c$ (FIG. 24*b*) in presence of combined variations of sunlight S and panel temperature T. The very high inverter performance in terms of maximum power point tracking MPPT are evident.

In particular, the comparison of the diagrams of FIGS. 10, 22, and 24 shows that the photovoltaic single stage inverter device according to the invention has optimal performance in terms of both MPPT and PF-out, not attainable by applying prior art devices.

The present invention has been described, by way of illustration and not by way of limitation, according its preferred embodiment, but it should be understood that those skilled in the art can make variations and/or changes, without so departing from the related scope of protection, as defined by the enclosed claims.

The invention claimed is:

1. A single stage inverter device, for converters of power from dc energy sources to an electric ac network or grid having at least one phase, of pulsation frequency $\omega_{grid}$, comprising switching means capable to periodically connect, with period $T_s$ lower than the period $T_{grid}$ corresponding to the pulsation frequency $\omega_{grid}$, a source, capable to output a voltage vg(t) of average value $V_g$, to the grid so that the device output current $i_0(t)$ is in phase with the voltage $v_0(t)$ of at least one phase of the grid, the maximum value of which is $V_{o,max}$, the switching means being controlled by controlling electronic means operating according to a control over a single switching cycle of the switching means, the device seeing an output inductance L, the device comprising a sensing resistor of resistance $R_s$ connected in series to the grid, the controlling electronic means comprising:

a resettable integrator circuit having a time constant $\tau$ such that $\tau < T_s$, the input of which receives a voltage signal $(V_c - K_g * V_g)$ equal to the difference between a control voltage $V_c$ and a voltage proportional by a first factor $K_g$ to the output voltage $v_g(t)$ of the source, comparator means, capable to output a signal indicative of the comparison of a voltage drop $[R_s \cdot i_o(t)]$ on the sensing resistor with the sum of the output signal of the integrator circuit and a voltage $[K \cdot v_o(t)]$ proportional by a second factor K to the voltage $v_0(t)$ of the grid, and generator means capable to receive the output signal from the comparator means and a signal indicative of the phase of the grid for providing one or more signals for controlling the switching means, the control voltage $V_c$ and the first factor $K_g$ being such as to fulfil the following first constraint:

$$V_c \geq K_g V_g + \frac{(2V_{o,max} - V_g)R_s\tau}{2L},$$

wherein the device fulfils a second constraint whereby the input signal of the integrator circuit is always positive, and it fulfils a third constraint whereby, at any time instant, the input voltage of the switching means is higher than the output voltage thereof, and it fulfils a fourth constraint whereby $$K\left(1 - \frac{P_o(S)}{\alpha \cdot P_{g,MPP}(S_{max})}\right) \cdot (1-\gamma) \leq \left.\frac{V_m}{V_g}\right|_{min} \leq \left.\frac{V_m}{V_g}\right|_{max}$$

$$\left.\frac{V_m}{V_g}\right|_{min} \leq \left.\frac{V_m}{V_g}\right|_{max} \leq K\left(1 - \frac{P_o(S)}{\alpha \cdot P_{g,MPP}(S_{max})}\right) \cdot (1+\gamma)$$

where:

$$v_m = \left(\frac{V_c - K_g \cdot v_g}{\tau}\right) \cdot T_s$$

$P_o(S)$ is the device output average power for a set S of operation conditions, $P_{g,MPP}(S_{max})$ is the maximum power deliverable by the source, $\alpha$ is a first coefficient of overload, with $\alpha \geq 1$, and $\gamma$ is a second coefficient, with $\gamma < 1$.

2. A device according to claim 1, wherein the control voltage $V_c$ and the first factor $K_g$ are such that:

$$V_c > K_g(V_g + \Delta V_g)$$

where $\Delta V_g$ is the peak-to-peak amplitude of the oscillation of the voltage $v_g(t)$.

3. A device according to claim 1, wherein the second factor K is such that:

$$V_g - \Delta V_g > (1+K) \cdot V_{o,max}$$

where $\Delta V_g$ is the peak-to-peak amplitude of the oscillation of the voltage $v_g(t)$.

4. A device according to claim 1, wherein the resettable integrator circuit is reset when $|R_s{*}i_o| > |K{*}v_o| - v_m{*}t/T_s$.

5. A device according to claim 1, wherein the controlling electronic means further comprises processing electronic means, connected at its input to the source for determining the power thereof with sampling period $T_a$, capable to output at least one signal capable to vary the value of at least one corresponding parameter, selected from the group comprising the resistance $R_s$, the time constant $\tau$, the control voltage $V_c$, the first factor $K_g$, the second factor K, and a combination of them, by continuously perturbing the output average power $P_o(S)$ so as to search the maximum output power point according to the so called hill climbing method.

6. A device according to claim 5, wherein the processing electronic means is capable to detect the instant output voltage and current of the source.

7. A device according to claim 5, wherein $T_a > T_s$.

8. A device according to claim 5, wherein the processing electronic means outputs the control voltage $V_c$, that is provided as input to the integrator circuit.

9. A device according to claim 1, wherein the controlling electronic means are at least partially integrated in at least one microprocessor and/or at least one digital signal processor and/or at least one microcontroller.

10. A device according to claim 1, wherein the source is such that the point of maximum input power of the device is variable and/or the factor of output power or PF-out of the device is variable with the set S of operation conditions.

11. A device according to claim 10, wherein the source is a renewable energy source.

12. A device according to claim 11, wherein the source is a photovoltaic source, the operation conditions of the set S being one or more conditions selected from the group comprising sunlight level, temperature, and source degradation.

13. A device according to claim 1, wherein the electric network is a single-phase or three-phase network.

14. A single switching cycle method of controlling switching means of a single stage inverter device, for converters of power from dc energy sources to an electric ac network or grid having at least one phase, of pulsation frequency $\omega_{grid}$, wherein the switching means periodically connects, with period $T_s$ lower than the period $T_{grid}$ corresponding to the pulsation frequency $\omega_{grid}$, a source, capable to output a voltage $v_g(t)$ of average value $V_g$, to the grid so that the device output current $i_0(t)$ of each phase is in phase with the voltage $v_0(t)$ of the same phase of the grid the maximum value of which is $V_{o,max}$, the method comprising the following steps:

A. integrating, according to a time constant $\tau$ such that $\tau < T_s$, a voltage signal $(V_c - K_g{*}v_g)$ equal to the difference between a control voltage $V_c$ and a voltage proportional by a first factor $K_g$ to the output voltage $v_g(t)$ of the source, B. comparing a voltage drop $[R_s \cdot i_o(t)]$, on a sensing resistor of resistance $R_s$ connected in series to the grid, with the sum of the result of the integration of step A with a voltage $[K \cdot v_o(t)]$ proportional by a second factor K to the voltage $v_0(t)$ of the grid, and C. generating one or more signals for controlling the switching means on the basis of the result of the comparison of step B, the control voltage $V_c$ and the first factor $K_g$ being such as to fulfil the following first constraint:

$$V_c \geq K_g V_g + \frac{(2V_{o,max} - V_g)R_s\tau}{2L},$$

where L is the output inductance seen by the inverter device, wherein the voltage signal integrated in step A is always positive, the input voltage of the switching means (M1-M4) is higher than the output voltage thereof, and $$K\left(1 - \frac{P_o(S)}{\alpha \cdot P_{g,MPP}(S_{max})}\right) \cdot (1-\gamma) \leq \left.\frac{V_m}{V_g}\right|_{min} \leq \left.\frac{V_m}{V_g}\right|_{max}$$

$$\left.\frac{V_m}{V_g}\right|_{min} \leq \left.\frac{V_m}{V_g}\right|_{max} \leq K\left(1 - \frac{P_o(S)}{\alpha \cdot P_{g,MPP}(S_{max})}\right) \cdot (1+\gamma)$$

where:

$$v_m = \left(\frac{V_c - K_g \cdot v_g}{\tau}\right) \cdot T_s$$

$P_o(S)$ is the device output average power for a set S of operation conditions, $P_{g,MPP}(S_{max})$ is the maximum power deliverable by the source, $\alpha$ is a first coefficient of overload, with a $\alpha \geq 1$, and $\gamma$ is a second coefficient, with $\gamma < 1$.

15. A method according to claim 14, wherein the control voltage $V_c$ and the first factor $K_g$ are such that:

$$V_c > K_g(V_g + \Delta V_g)$$

where $\Delta V_g$ is the peak-to-peak amplitude of the oscillation of the voltage $v_g(t)$.

16. A method according to claim 14, wherein the second factor K is such that:

$$V_g - \Delta V_g > (1+K) \cdot V_{o,max}$$

where $\Delta V_g$ is the peak-to-peak amplitude of the oscillation of the voltage $v_g(t)$.

17. A method according to claim 14, wherein the result of the integration of step A is reset when $$|R_s * i_o| > |K * v_o| - v_m * t / T_s.$$

18. A method of scaling a single stage inverter device, for converters of power from dc energy sources to an electric ac network or grid having at least one phase, of pulsation frequency $\omega_{grid}$, wherein the device comprises switching means capable to periodically connect, with period $T_s$ lower than the period $T_{grid}$ corresponding to the pulsation frequency $\omega_{grid}$, a source, capable to output a voltage $v_g(t)$ of average value $V_g$, to the grid so that the device output current $i_o(t)$ is in phase with the voltage $v_o(t)$ of at least one phase of the grid, the maximum value of which is $V_{o,max}$, the switching means being controlled by controlling electronic means operating according to a control over a single switching cycle of the switching means, the device seeing an output inductance L, the device comprising a sensing resistor of resistance $R_s$ connected in series to the grid, the controlling electronic means comprising:
  a resettable integrator circuit having a time constant $\tau$ such that $\tau < T_s$, the input of which receives a voltage signal $(V_c - K_g * v_g)$ equal to the difference between a control voltage $V_c$ and a voltage proportional by a first factor $K_g$ to the output voltage $v_g(t)$ of the source,
  comparator means, capable to output a signal indicative of the comparison of a voltage drop $[R_s \cdot i_o(t)]$ on the sensing resistor with the sum of the output signal of the integrator circuit and a voltage $[K \cdot v_o(t)]$ proportional by a second factor K to the voltage $v_o(t)$ of the grid, and
  generator means capable to receive the output signal from the comparator means and a signal indicative of the phase of the grid for providing one or more signals for controlling the switching means,
the control voltage $V_c$ and the first factor $K_g$ being such as to fulfil the following first constraint:

$$V_c \geq K_g V_g + \frac{(2V_{o,max} - V_g) R_s \tau}{2L},$$

wherein the device fulfils a second constraint whereby the input signal of the integrator circuit is always positive, and it fulfils a third constraint whereby, at any time instant, the input voltage of the switching means is higher than the output voltage thereof, and it fulfils a fourth constraint whereby $$K\left(1 - \frac{P_o(S)}{\alpha \cdot P_{g,MPP}(S_{max})}\right) \cdot (1-\gamma) \leq \left.\frac{V_m}{V_g}\right|_{min} \leq \left.\frac{V_m}{V_g}\right|_{max}$$

$$\left.\frac{V_m}{V_g}\right|_{min} \leq \left.\frac{V_m}{V_g}\right|_{max} \leq K\left(1 - \frac{P_o(S)}{\alpha \cdot P_{g,MPP}(S_{max})}\right) \cdot (1+\gamma)$$

where:

$$v_m = \left(\frac{V_c - K_g \cdot v_g}{\tau}\right) \cdot T_s$$

$P_o(S)$ is the device output average power for a set S of operation conditions,
$P_{g,MPP}(S_{max})$ is the maximum power deliverable by the source,
$\alpha$ is a first coefficient of overload, with $\alpha \geq 1$, and
$\gamma$ is a second coefficient, with $\gamma < 1$,
wherein the scaling method selects the values of the resistance $R_s$, of the time constant $\tau$, of the control voltage $V_C$, of the first factor $K_g$, and of the second factor K such as to minimise at least one merit figure selected from the group comprising:
  a merit figure $\Psi_0$, equal to $$\Psi_0 = P_{g,MPP}(S_0) - P_o(S_0)$$

where $S_0$ is a set S of specific operation conditions and $P_g(S_0)$ is the power delivered by the source in correspondence of the set $S_0$ of specific operation conditions, and
  a further merit figure $\Psi_3$, equal to the root mean square deviation of the maximum power $P_{g,MPP}(S)$ deliverable by the source and the device output power $P_o(S)$ over a whole range $[S_{min}, S_{max}]$ of sets S of operation conditions, that is $$\Psi_3 = \sqrt{\sum_{k=1}^{N} \frac{[P_{g,MPP}(S_k) - P_o(S_k)]^2}{P_{g,MPP}^2(S_k)}}$$

where $S_{min}$ and $S_{max}$ are sets of specific operation conditions whereby $P_{g,MPP}(S)$ assumes, respectively, the minimum and the maximum value within the range $[S_{min}, S_{max}]$.

19. A method according to claim 18, wherein the merit figure $\Psi_0 = \Psi_1$ is calculated for the set $S_{min}$ of specific operation conditions.

20. A method according to claim 18, wherein the merit figure $\Psi_0 = \Psi_2$ is calculated for the set $S_{max}$ of specific operation conditions.

21. A method according to claim 18, wherein the values of the resistance $R_s$, of the time constant $\tau$, of the control voltage $V_c$, of the first factor $K_g$, and of the second factor K are determined through at least one either deterministic and stochastic numerical technique.

22. A method according to claim 21, characterised in that said at least one either deterministic and stochastic numerical technique comprises an estimation through the Montecarlo method and/or an evolutionary type search algorithms, preferably a genetic algorithm.

23. A method according to claim 18, wherein the source is a photovoltaic source, the operation conditions of the set S being one or more conditions selected from the group comprising sunlight level, temperature, and source degradation.

24. A controller device for controlling switching means of a single stage inverter device, for converters of power from dc energy sources to an electric ac network or grid having at least one phase, of pulsation frequency $\omega_{grid}$, wherein the switching means are capable to periodically connect, with period $T_s$ lower than the period $T_{grid}$ corresponding to the pulsation frequency $\omega_{grid}$, a source, capable to output a voltage $v_g(t)$ of average value $V_g$, to the grid so that the device output current $i_o(t)$ is in phase with the voltage $v_o(t)$ of at least one phase of the grid, the maximum value of which is $V_{o,max}$, wherein the controller device operates according to a control over a single switching cycle of the switching means, wherein the device sees an output inductance L, wherein the device comprises a sensing resistor of resistance $R_s$ connected in series to the grid, wherein the controller device comprises:
- a resettable integrator circuit having a time constant $\tau$ such that $\tau < T_s$, the input of which receives a voltage signal $(V_c - K_g * v_g)$ equal to the difference between a control voltage $V_c$ and a voltage proportional by a first factor $K_g$ to the output voltage $v_g(t)$ of the source,
- comparator means, capable to output a signal indicative of the comparison of a voltage drop $[R_s \cdot i_o(t)]$ on the sensing resistor with the sum of the output signal of the integrator circuit and a voltage $[K \cdot v_0(t)]$ proportional by a second factor K to the voltage $v_0(t)$ of the grid, and
- generator means capable to receive the output signal from the comparator means and a signal indicative of the phase of the grid for providing one or more signals for controlling the switching means.

25. A controller device according to claim 24, wherein it is capable to perform a single switching cycle method comprising the following steps:
- A. integrating, according to a time constant $\tau$ such that $\tau < T_s$, a voltage signal $(V_c - K_g * v_g)$ equal to the difference between a control voltage $V_c$ and a voltage proportional by a first factor $K_g$ to the output voltage $v_g(t)$ of the source,
- B. comparing a voltage drop $[R_s \cdot i_o(t)]$, on a sensing resistor of resistance $R_s$ connected in series to the grid, with the sum of the result of the integration of step A with a voltage $[K \cdot v_o(t)]$ proportional by a second factor K to the voltage $v_0(t)$ of the grid, and
- C. generating one or more signals for controlling the switching means on the basis of the result of the comparison of step B, the control voltage $V_c$ and the first factor $K_g$ being such as to fulfil the following first constraint:

$$V_c \geq K_g V_g + \frac{(2V_{o,max} - V_g)R_s \tau}{2L},$$

where L is the output inductance seen by the inverter device, wherein the voltage signal integrated in step A is always positive, the input voltage of the switching means (M1-M4) is higher than the output voltage thereof, and $$K\left(1 - \frac{P_o(S)}{\alpha \cdot P_{g,MPP}(S_{max})}\right) \cdot (1 - \gamma) \leq \left.\frac{V_m}{V_g}\right|_{min} \leq \left.\frac{V_m}{V_g}\right|_{max}$$

$$\left.\frac{V_m}{V_g}\right|_{min} \leq \left.\frac{V_m}{V_g}\right|_{max} \leq K\left(1 - \frac{P_o(S)}{\alpha \cdot P_{g,MPP}(S_{max})}\right) \cdot (1 + \gamma)$$

where:

$$v_m = \left(\frac{V_c - K_g \cdot v_g}{\tau}\right) \cdot T_s$$

$P_o(S)$ is the device output average power for a set S of operation conditions,
$P_{g,MPP}(S_{max})$ is the maximum power deliverable by the source,
$\alpha$ is a first coefficient of overload, with $\alpha \geq 1$, and
$\gamma$ is a second coefficient, with $\gamma < 1$.

* * * * *